(12) United States Patent  
Foster et al.

(10) Patent No.: US 7,736,114 B2  
(45) Date of Patent: Jun. 15, 2010

(54) RELEASABLE CONNECTION BETWEEN MEMBERS

(75) Inventors: Raymond Keith Foster, Madras, OR (US); Randall Mark Foster, Madras, OR (US); John Scott Cook, Madras, OR (US)

(73) Assignee: Keith Manufacturing Co., Madras, OR (US)

( * ) Notice: Subject to any disclaimer, the term of this patent is extended or adjusted under 35 U.S.C. 154(b) by 0 days.

(21) Appl. No.: 12/004,377

(22) Filed: Dec. 19, 2007

(65) Prior Publication Data

US 2008/0175696 A1    Jul. 24, 2008

(51) Int. Cl.  
*B65G 25/04* (2006.01)

(52) U.S. Cl. .................... 414/398; 198/774.1; 414/392; 414/525.1

(58) Field of Classification Search ................. 414/257, 414/392, 398, 402, 525.1, 525.9; 198/583, 198/774.1, 775  
See application file for complete search history.

(56) References Cited

U.S. PATENT DOCUMENTS

| | | | | |
|---|---|---|---|---|
| 2,563,427 A | * | 8/1951 | Scott | 198/583 |
| 2,828,027 A | * | 3/1958 | Stevenson et al. | 414/349 |
| 3,958,701 A | * | 5/1976 | Yatagai et al. | 414/349 |
| 5,588,522 A | * | 12/1996 | Foster et al. | 198/775 |
| 5,911,555 A | * | 6/1999 | Foster | 414/398 |
| 6,065,923 A | * | 5/2000 | Foster | 414/401 |
| 6,439,375 B1 | * | 8/2002 | Foster et al. | 198/775 |
| 6,808,356 B2 | * | 10/2004 | Iwasaki et al. | 414/392 |
| 7,083,041 B1 | * | 8/2006 | Foster et al. | 198/750.14 |
| 2002/0085904 A1 | * | 7/2002 | Hallstrom et al. | 414/400 |

* cited by examiner

*Primary Examiner*—James Keenan  
(74) *Attorney, Agent, or Firm*—Bruce A. Kaser

(57) ABSTRACT

A trailer (T) and a dock (D) are provided with substantially identical slat conveyors (10, 12). Each conveyor (10, 12) has alternating conveyor slats (36, 36') and lifting/holding slats (38, 38'). The trailer (T) is backed up to the dock (D). Upper portions of the lifting/holding slats (38, 38') are coupled together at their ends. The confronting ends of the conveying slats (36, 36') are also coupled together. A mechanism carried by the dock (D) raises and lowers the upper portions of the two sets of lifting/holding slats (38, 38') a drive mechanism carried by the dock (D) where it reciprocates both sets of conveying slats (36, 36').

2 Claims, 26 Drawing Sheets

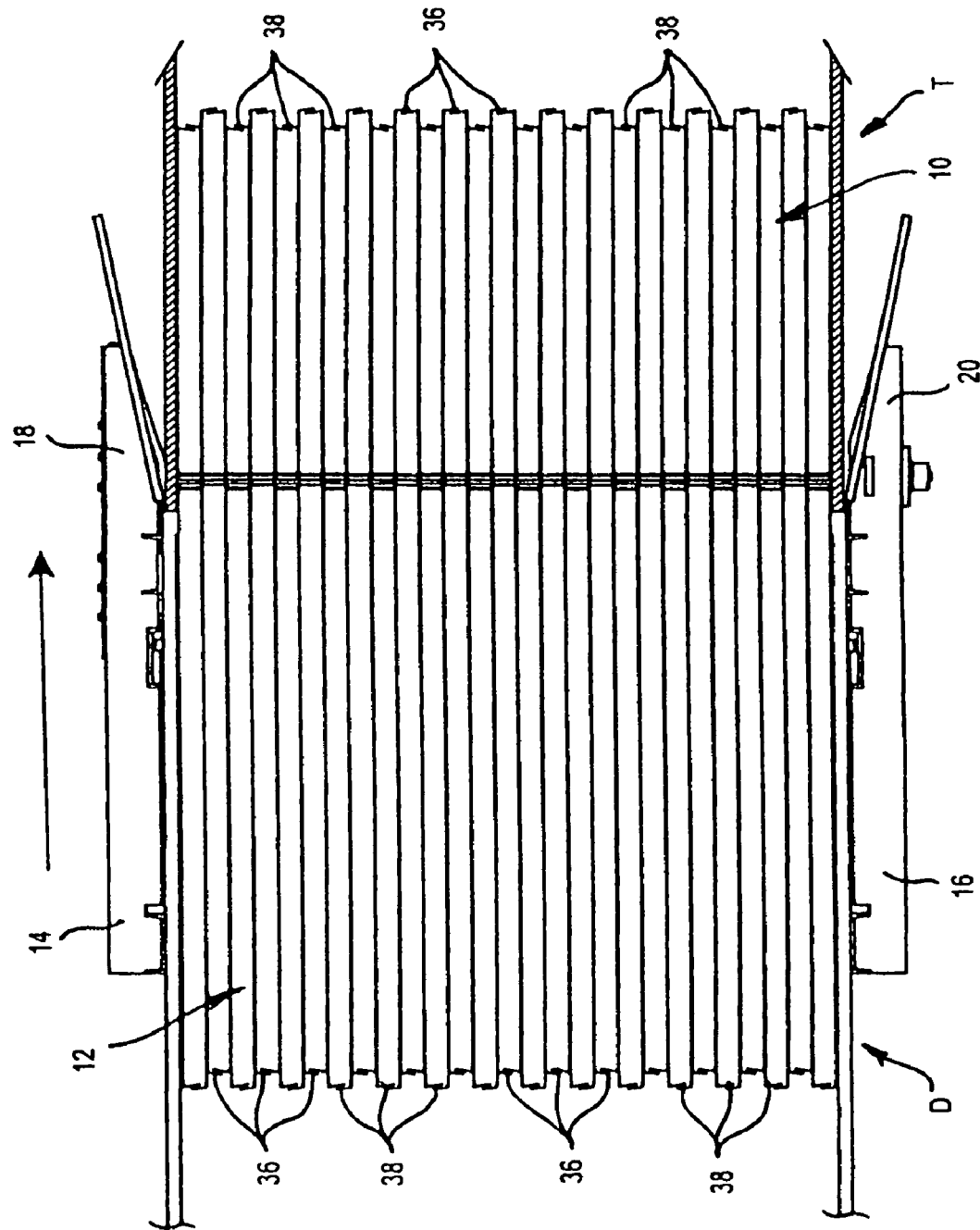

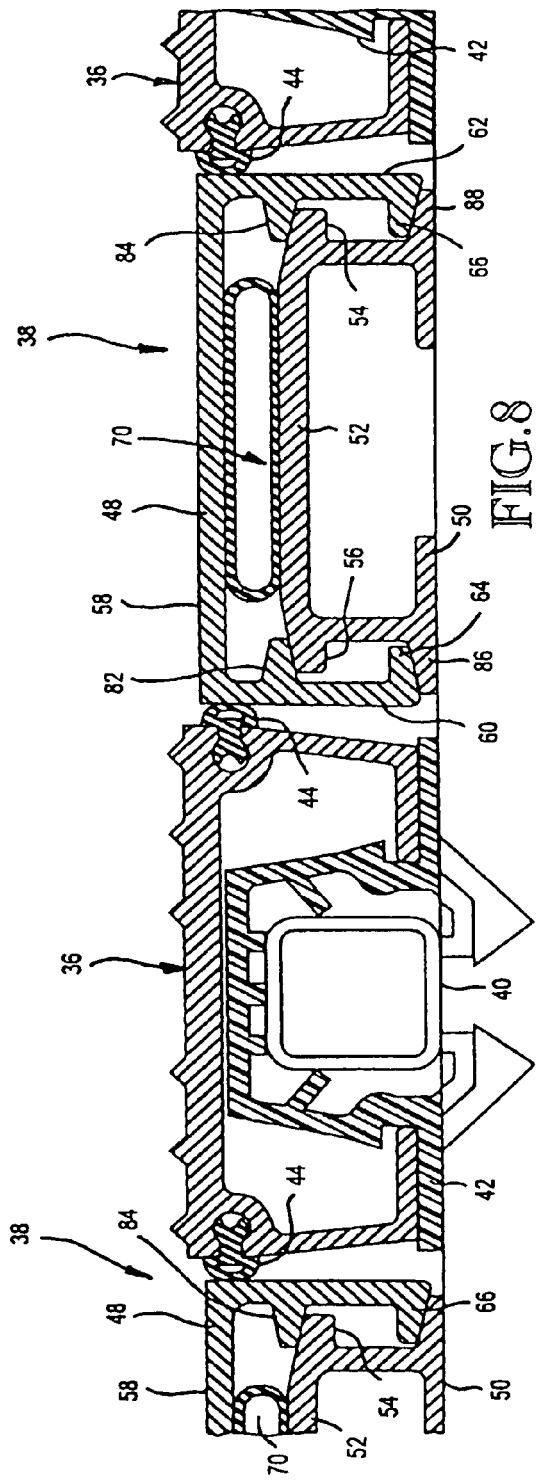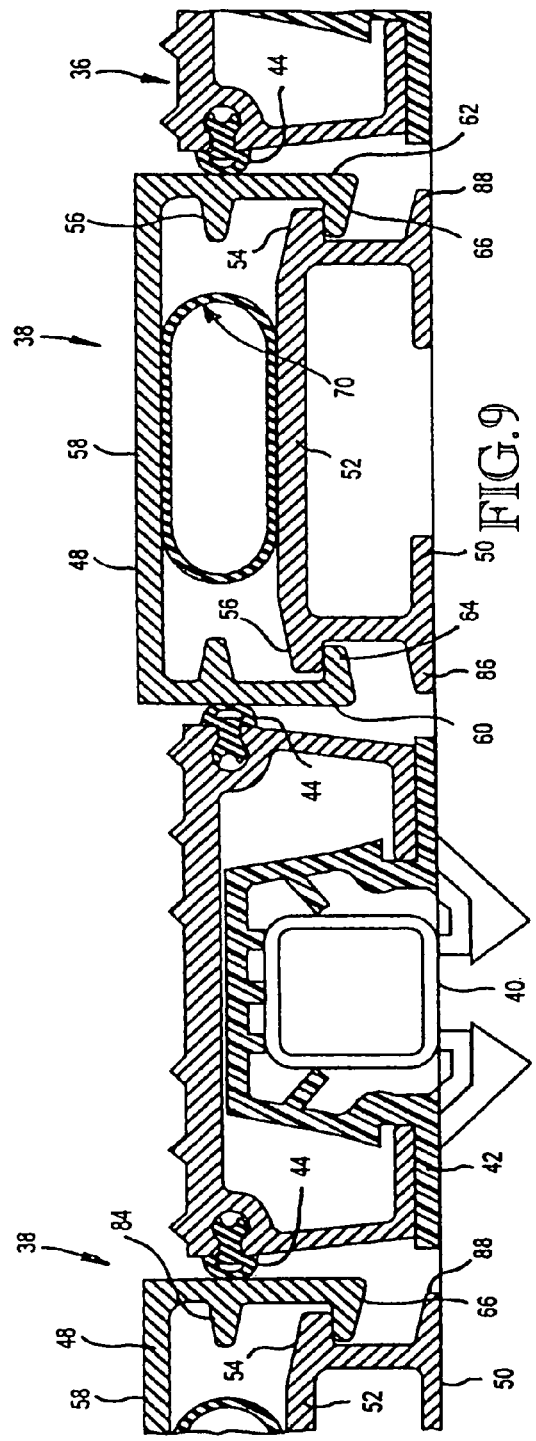

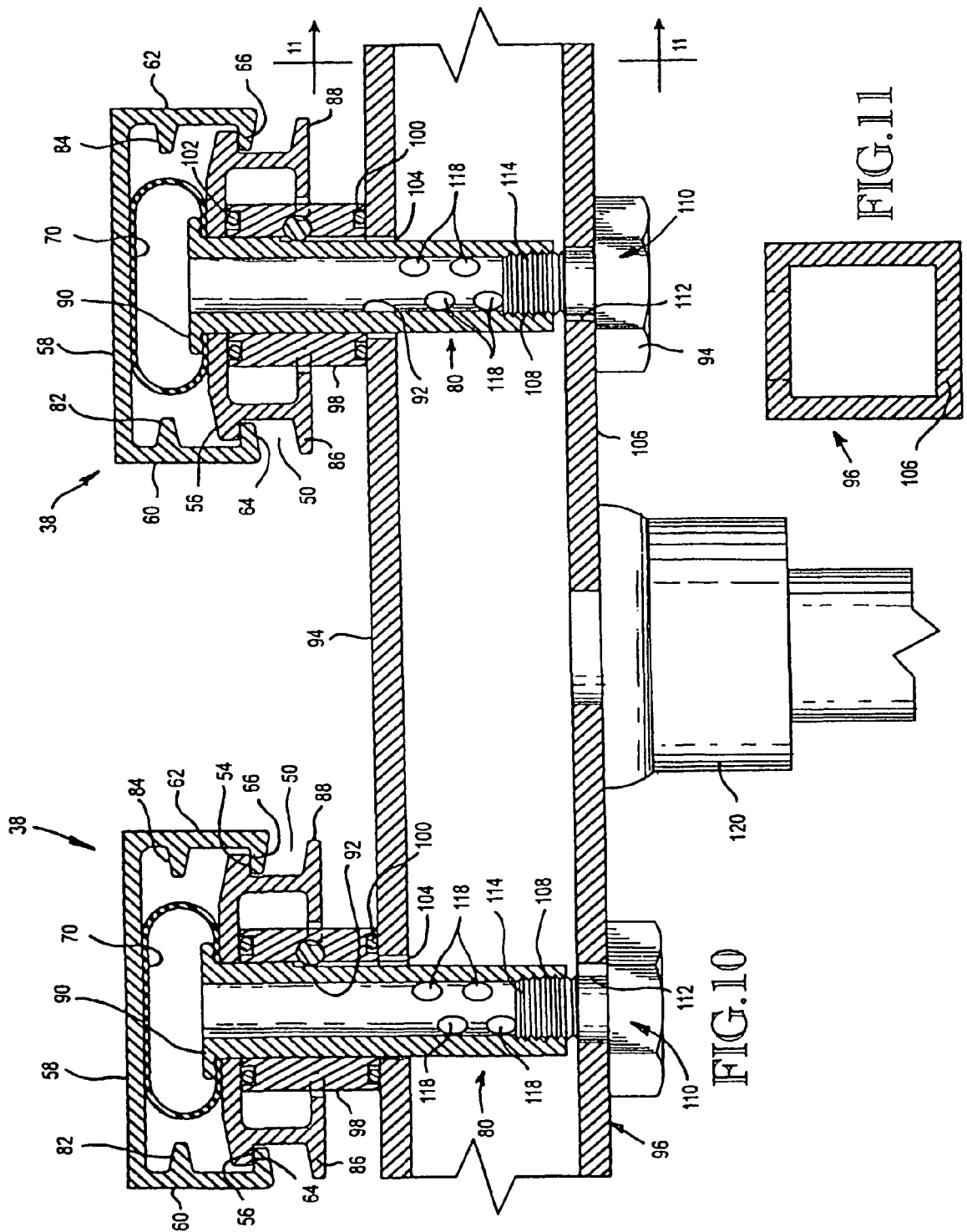

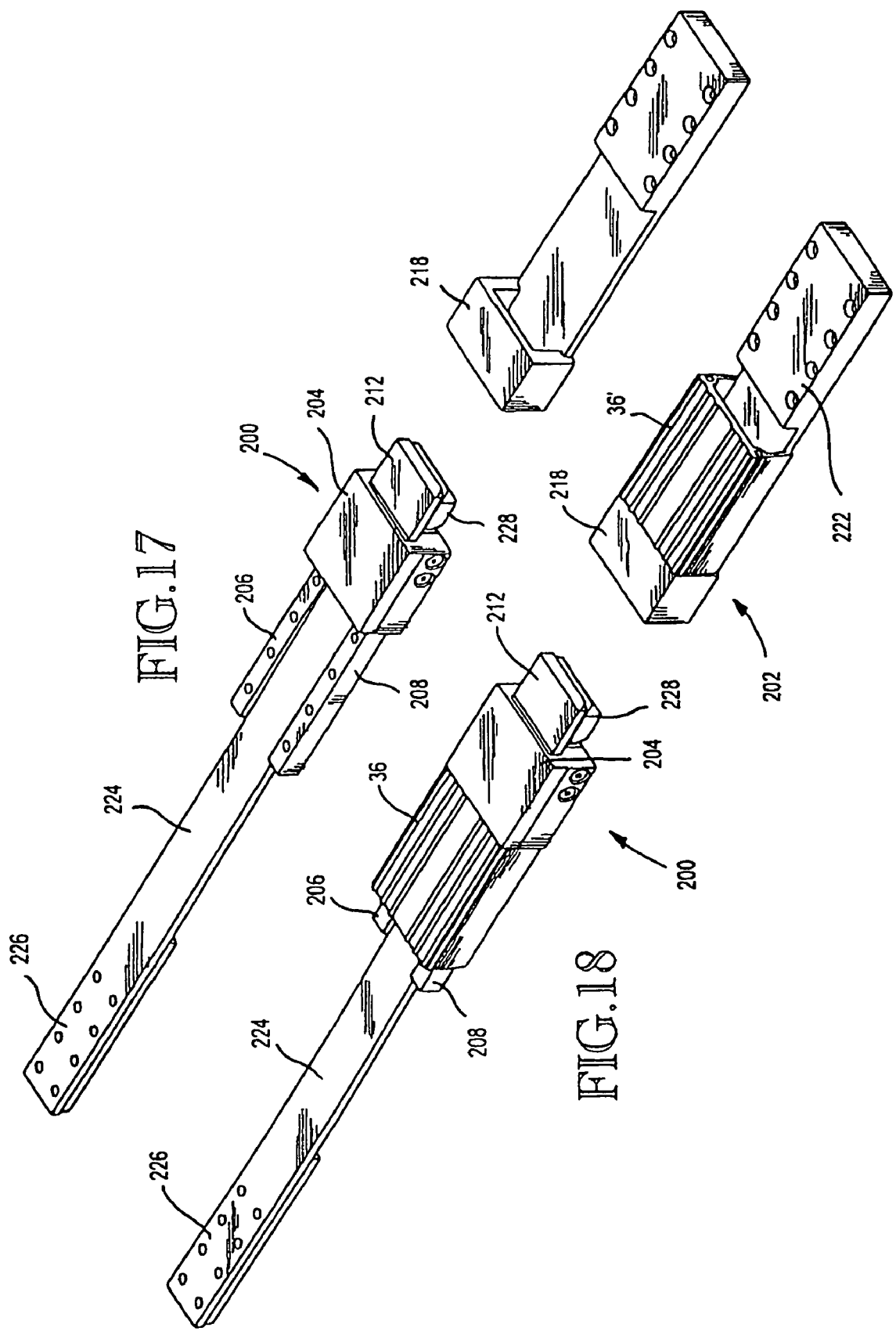

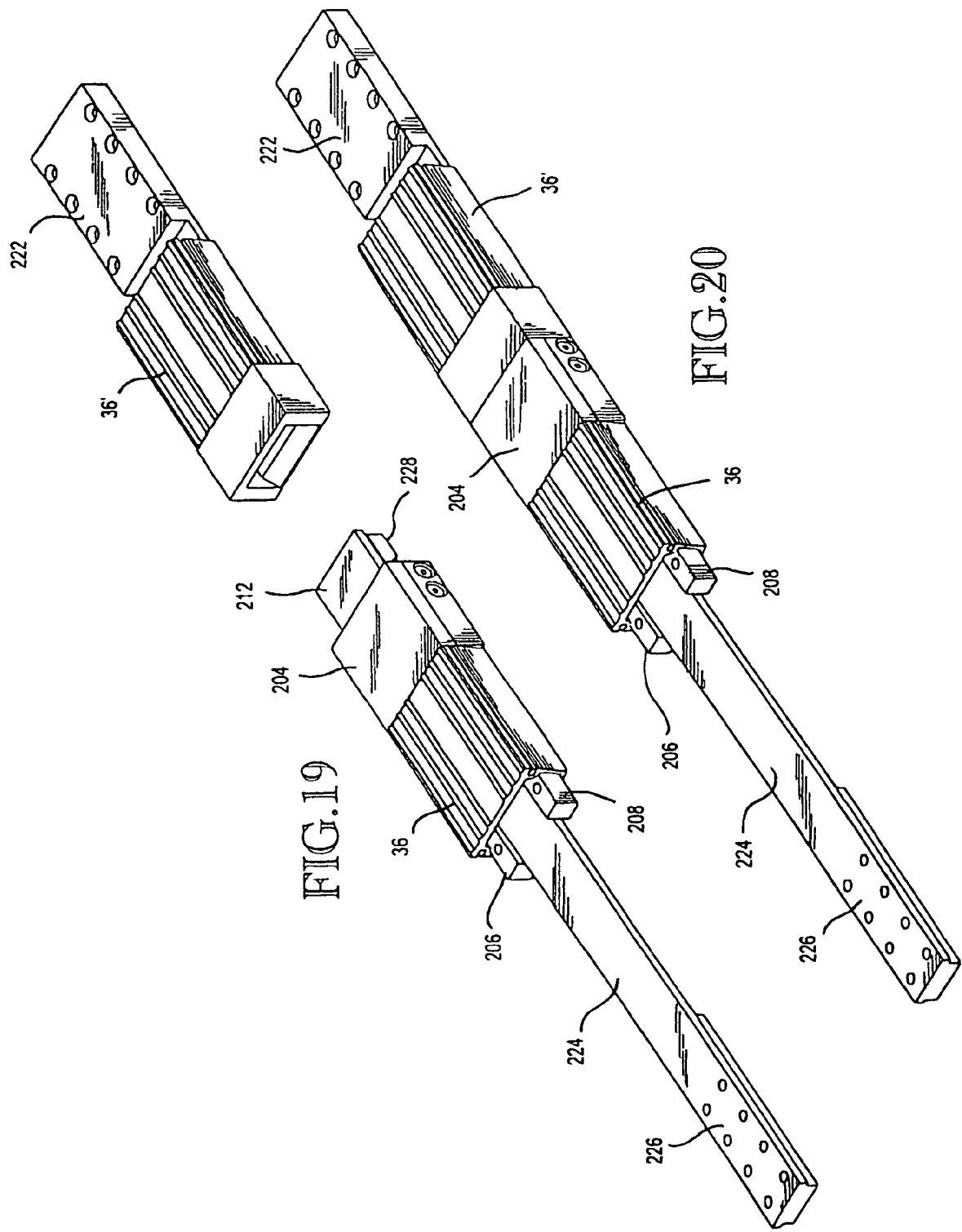

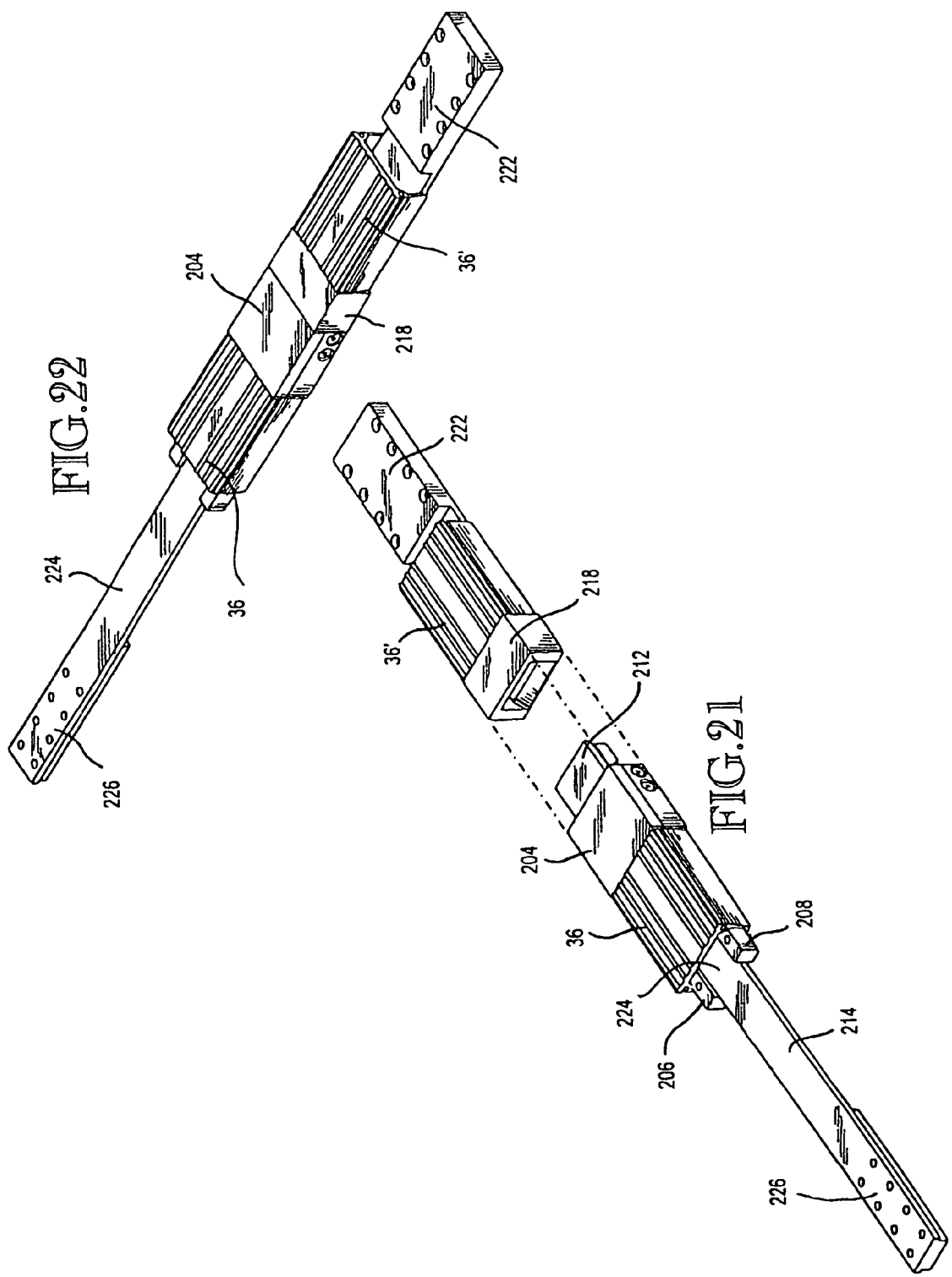

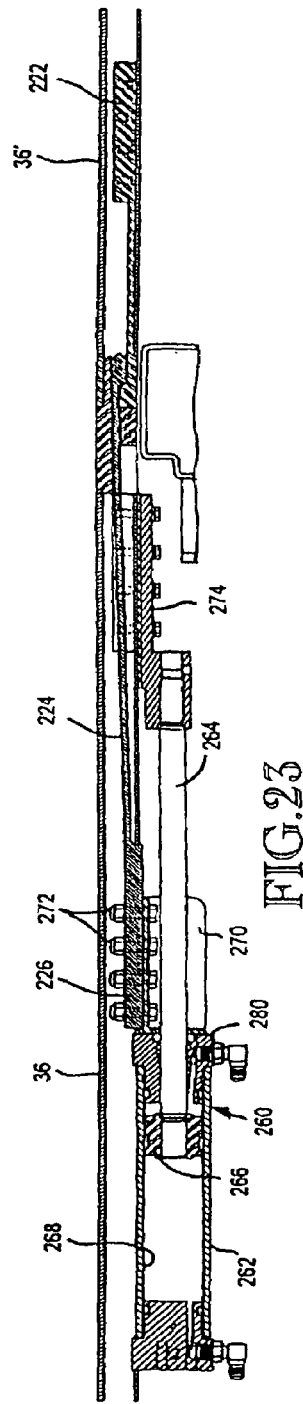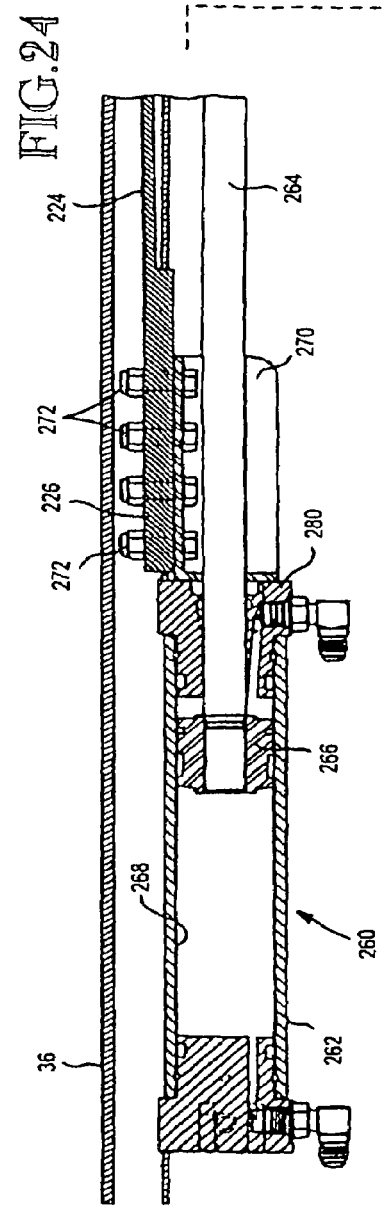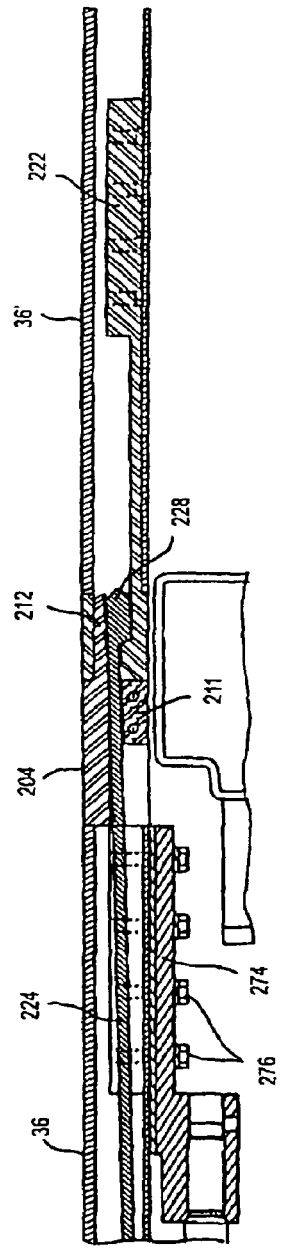

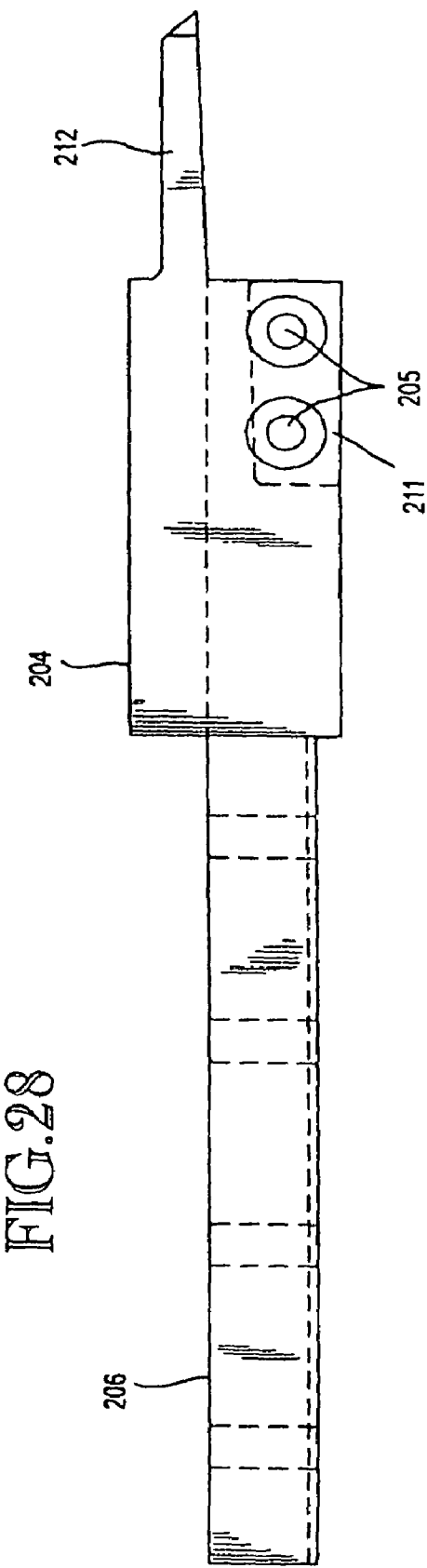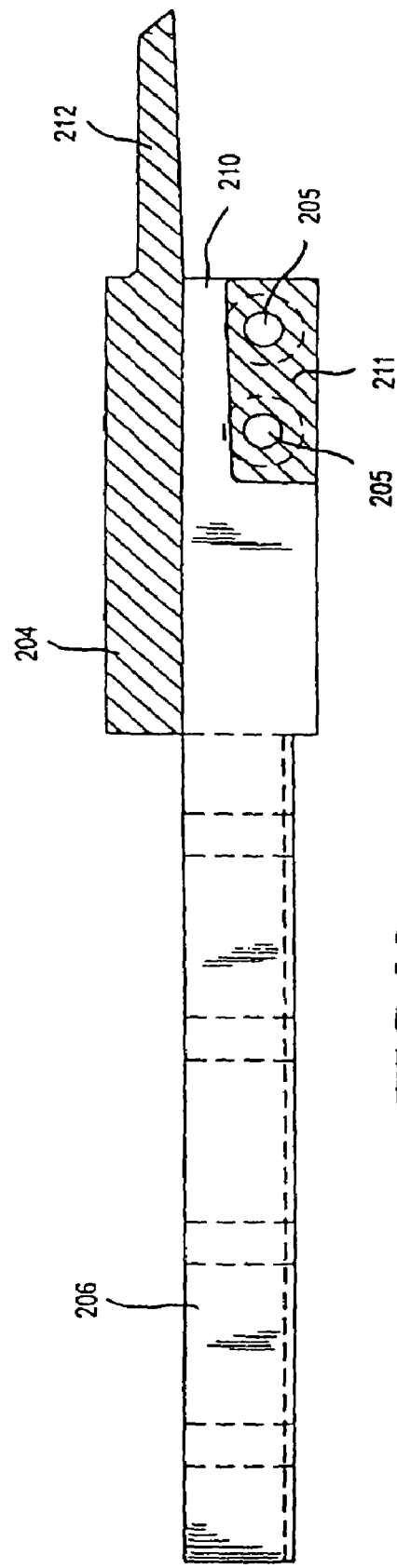

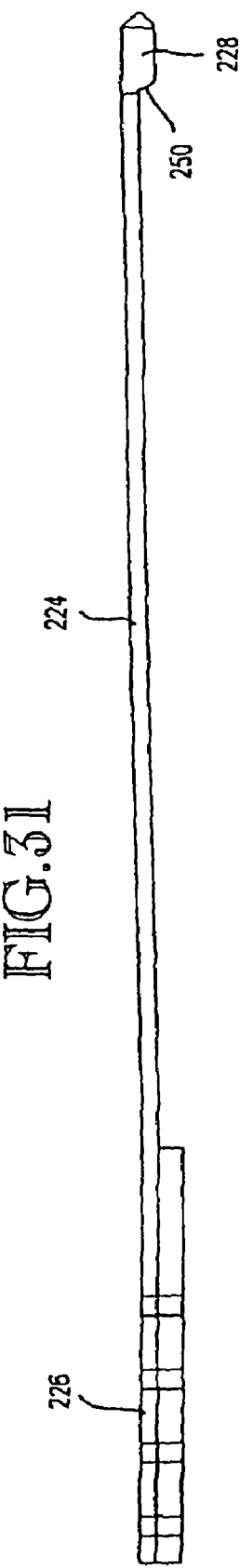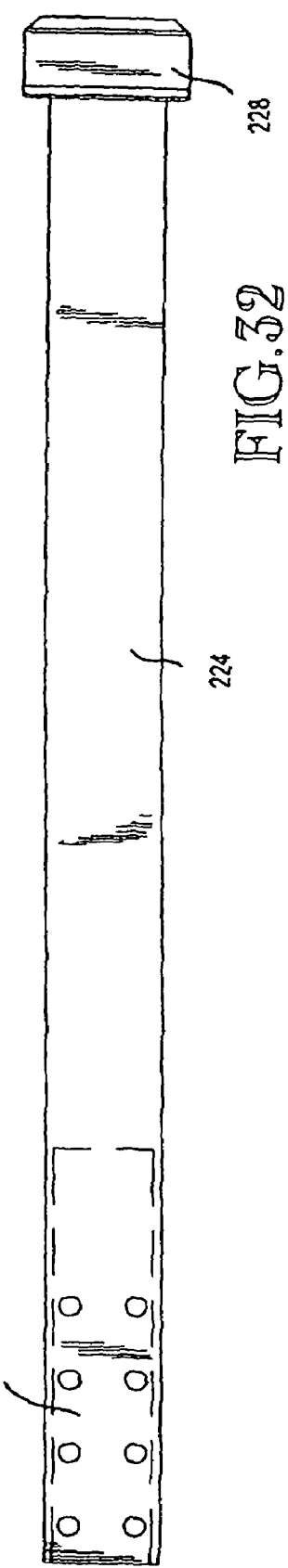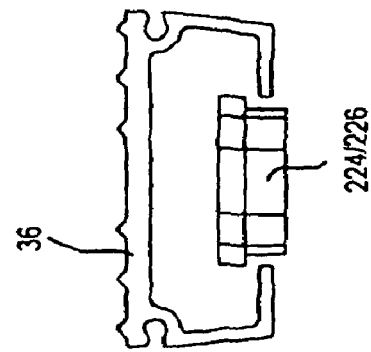
FIG. 31
FIG. 32
FIG. 33

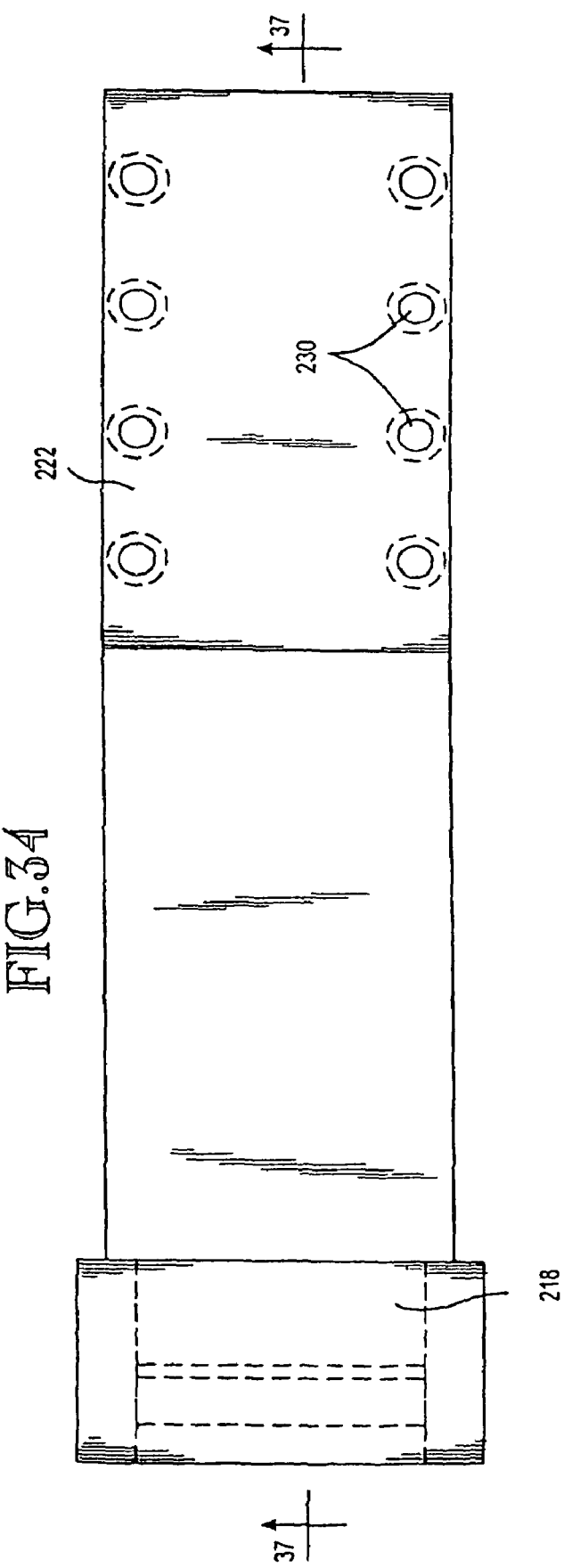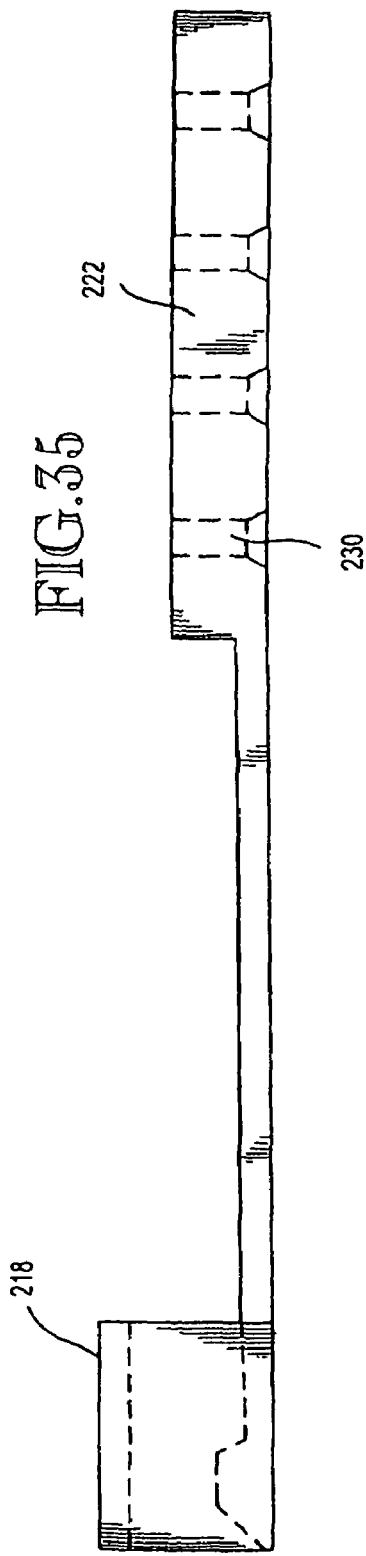

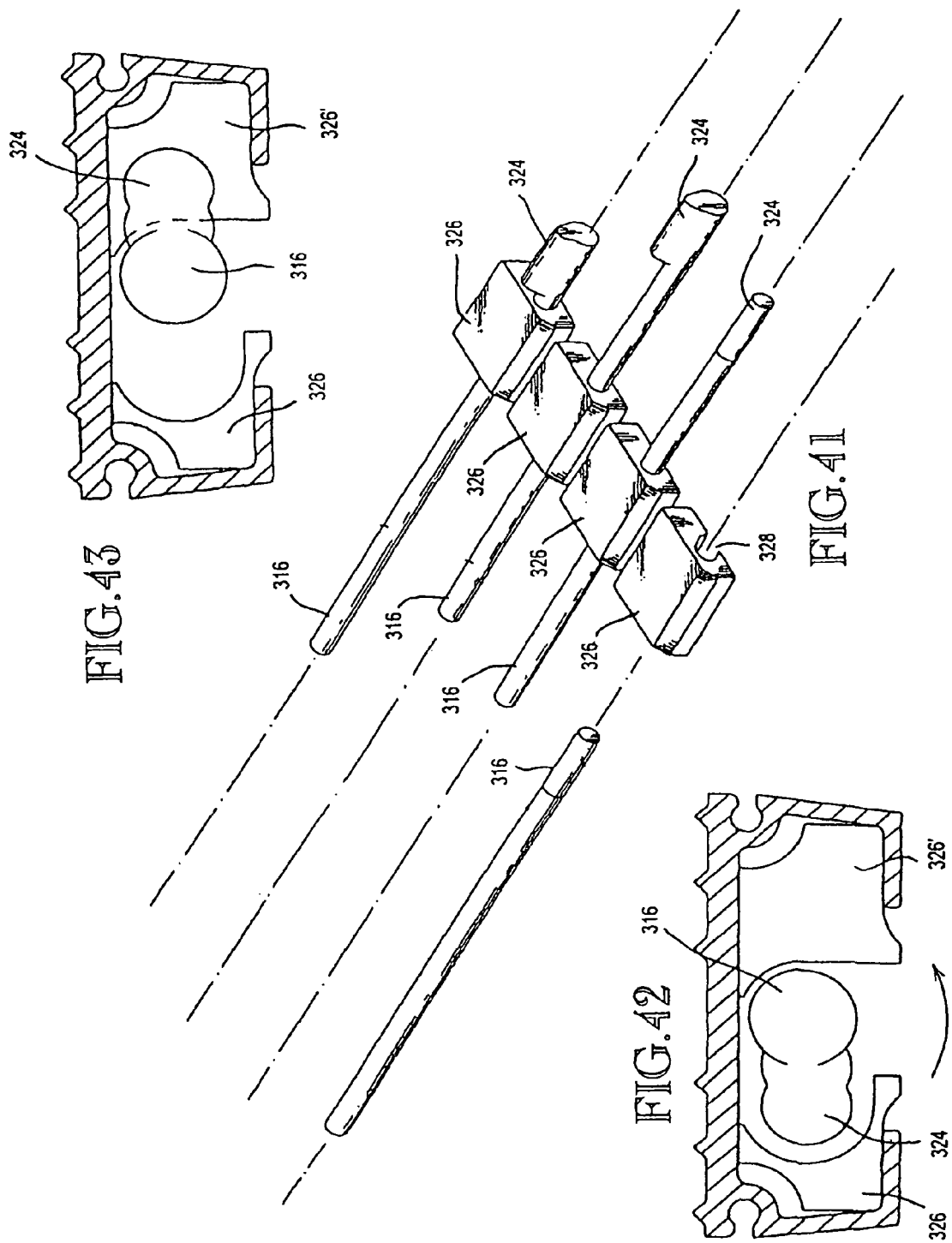

RELEASABLE CONNECTION BETWEEN MEMBERS

TECHNICAL FIELD

This invention relates to releasable connections between members, such as, for example, the slats of two slat conveyors, one located on a dock and the other in a trailer.

BACKGROUND OF THE INVENTION

This invention utilizes and improves technology that is disclosed in the following U.S. Pat. No. 5,588,522, granted Dec. 31, 1996, to Raymond Keith Foster and Randall Mark Foster, and entitled Reciprocating Floor Conveyor For Conveying Palletized Loads Or The Like; U.S. Pat. No. 5,911,555, granted Jun. 15, 1999, to Raymond Keith Foster, and entitled Vehicle/Dock Loading/Unloading Conveyor Systems; U.S. Pat. No. 6,065,923, granted May 23, 2000, to Raymond Keith Foster, and entitled Vehicle/Dock Alignment System; and U.S. Pat. No. 6,439,375, granted Aug. 27, 2002, to Raymond Keith Foster and Randall Mark Foster, and entitled Reciprocating Floor Conveyor For Conveying Palletized Loads Or The Like. It also utilizes technology disclosed in U.S. patent application Ser. No. 11/334,978 (issued as U.S. Pat. No. 7,083,041), filed Jan. 18, 2006, and entitled Slat Conveyor Having Conveyor Slats And Lifting/Holding Slats.

U.S. Pat. Nos. 5,588,522; 6,439,375 and 7,083,041 relate to using reciprocating slat conveyors for moving palletized loads. Problems associated with such loads are addressed by the use of slat conveyors having both conveying slats and lifting/holding slats. The lifting/holding slats have upper portions that are moved vertically between "up" positions in which their upper surfaces are above the upper surfaces of the conveying slats, and "down" positions in which their upper surfaces are below the upper surfaces of the conveying slats. When the lifting/holding slats are in their "down" position, the load rests on the conveying slats. The conveying slats are moved a stroke length and are then stopped. Then, the lifting/holding slats are moved upwardly into their "up" position to lift the load up off the conveying slats. Then, the conveying slats are retracted to a start position. The lifting/holding slats are moved back into their "down" position and the cycle of operation is repeated until the cargo has been loaded or unloaded.

U.S. Pat. No. 5,911,555 relates to a way of coupling together the slats of a first conveyor in a vehicle (e.g. a trailer) and a second conveyor on a dock. U.S. Pat. No. 6,065,923 discloses a system for aligning the rear end of a vehicle with a confronting end of the dock. U.S. Pat. No. 7,083,041 relates to a system of conveying and lifting/holding slats in which the lifting/holding slats have upper and lower portions separated by air bladders. Air is introduced into the bladders for moving the upper portions of the lifting/holding slats upwardly into a holding position. Air is exhausted from the bladders to allow the load to move the upper portions of the lifting/holding slats into their down positions.

There is a need for an easy to make and use releasable connection between conveying and lifting/holding slats on a dock and conveying and lifting/holding slats in a vehicle. A principal object of the present invention is to fill this need. However, the connection for the conveying slats is not limited to use with conveyor slats but rather is believed to have general utility.

BRIEF SUMMARY OF THE INVENTION

The invention provides a connection for releasably connecting together first and second portions of first and second members. The first portion has a first passageway and the second portion has a second passageway. An elongated coupler member is in the first passageway. A shim projects endwise outwardly from the first portion on one side of the passageway. The coupler member is extendable endwise outwardly from the first passageway, beyond the shim, and when so extended is inserted into and moved through an entry portion of the second passageway. The first member is movable relatively towards the second member when the coupler member is extended. This moves the extended coupler member into and through the entry portion of the second passageway. Then the first member is moved so as to move the shim into the entry portion of the second passageway contiguous the coupler member. The second portion and said coupler member have confronting first and second lock surfaces that make contact with each other and hold the first and second members together when the shim and coupler member are both in the second passageway and the coupler member is retracted to place the first and second lock surfaces in contact with each other.

In a preferred embodiment, there is an alignment socket in one of the members at the end of the passageway in that member and there is an alignment insert adjacent an end of the other passageway in the other member. The alignment insert enters the alignment socket when the first and second members are moved together.

The entry portion of the second passageway is preferably formed laterally between a first side surface in the passageway and a lug on an opposite side surface. The lock surface on the second portion is a generally transverse surface on the lug positioned endwise inwardly of the entry portion of the second passageway. The shim preferably has a top surface that is substantially against the first side surface of the entry portion of the second passageway when the shim is in the second passageway.

According to an aspect of the invention, the coupler member comprises an elongated body having an outer end hook portion that extends laterally from the elongated body and includes the second lock surface.

The present invention also includes a method of connecting and disconnecting the first and second portions of the first and second members by a push/pull action. The elongated coupler member is extended endwise outwardly from the first passageway. Then, the hook is inserted into and moved through the entry portion of the second passageway. The first portion is then moved endwise to push the shim into the entry portion of the second passageway along side the body portion of the coupler member. Then, the coupler member is retracted to pull the second lock surface on the hook back towards and against the first lock surface. The hook pulls the second portion of the second member back against the first portion of the first member and holds the first and second members together.

The invention further includes a method of releasably connecting together the confronting ends of first and second conveyor slats.

These and other advantages, objects and features will become apparent from the following description of a best mode of the invention, from the accompanying drawings and from the claims which are all incorporated herein as part of the disclosure of the invention.

BRIEF DESCRIPTION OF THE SEVERAL VIEWS OF THE DRAWINGS

Like reference numerals are used to designate like parts throughout the several views of the drawing, and:

FIG. 7 is a view like FIG. 6, showing the conveying slats on the dock moved into engagement with the conveying slats on the vehicle;

FIG. 8 is a sectional view of a portion of a slat conveyor, showing a conveying slat along side of a lifting/holding slat that is shown in a "down" position;

FIG. 9 is a view like FIG. 3 but showing the lifting/holding slat in an "up" position;

FIG. 10 is a fragmentary view with some parts in section and some in elevation, such view showing lifting bladders for two lifting/holding slats in the process of receiving pressurized air from a manifold;

FIG. 11 is a cross sectional view taken substantially along line 11-11 of FIG. 10;

FIG. 17 is a pictorial view taken from above and looking towards the top and one side of fittings for the conveying slats on the dock and in the trailer, such view showing the fittings separated from the conveying slats and spaced apart from each other;

FIG. 18 is a view like FIG. 17, but with fragmentary end portions of the conveying slats added to the view;

FIG. 19 is a view like FIG. 18, but looking towards an end of the fitting that is attached to the conveying slat that is in the trailer;

FIG. 20 is a view like FIG. 19, but showing the conveying slats connected together;

FIG. 21 is a view taken from the same aspect of FIG. 19, but showing the conveying slats omitted for the purpose of better illustrating the fittings that make up the connection;

FIG. 22 is a view like FIG. 20, but taken from a different aspect;

FIG. 23 is a longitudinal sectional view of rear end portions of two conveying slats showing them coupled together, such view showing a hydraulic cylinder that is carried by the conveying slat on the dock, for extending and retracting the coupler member that is carried by the conveying slat on the dock;

FIG. 24 is an enlarged scale view of FIG. 23, shown in two parts;

FIG. 28 is a side elevational view of the fitting shown by FIG. 25;

FIG. 29 is a longitudinal sectional view taken substantially along line 29-29 of FIG. 25;

FIG. 31 is a side elevational view of the coupler member shown by FIG. 17;

FIG. 32 is plan view of the coupler member shown by FIG. 31;

FIG. 33 is an end view of a conveying slat showing the coupler member in the conveyor slat;

FIG. 34 is a plan view of a fitting at the rear end of a conveying slat in the trailer;

FIG. 35 is a side view of the rear end fitting for the conveying slat in the trailer;

FIG. 41 is a pictorial view of several lock rods in various positions relative to lock blocks that are in the conveyor slats that are in the trailer;

FIG. 42 is an enlarged scale cross-sectional view taken through the end portion of a conveying slat in the trailer, such view showing a hook at the outer end of the rod aligned with a tunnel opening in a lock block that is within the conveyor slat; and FIG. 43 is a view like FIG. 42, but showing the hook rotated over into a lock block engaging position.

DETAILED DESCRIPTION OF THE ILLUSTRATED EMBODIMENT

Figure 1:
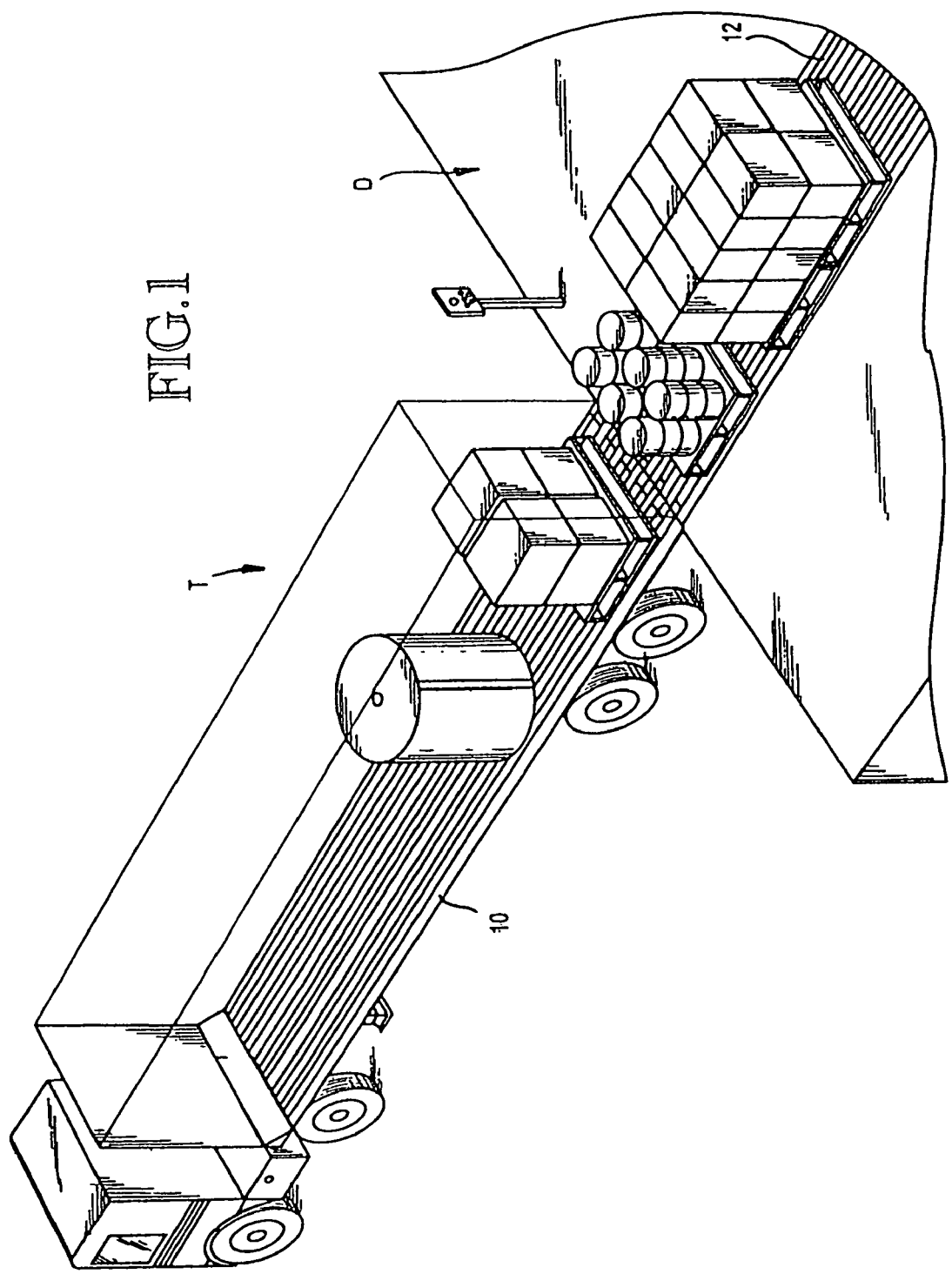
FIG. 1 is a pictorial view of a trailer backed up to a dock, for either receiving or depositing a load, such view being taken from above and looking towards the top, the driver's side and the rear end of the trailer, with the interior of the trailer shown, such view depicting cargo that is on a reciprocating slat conveyor that forms the floor of the trailer, such view showing a complementary slat conveyor on the dock.

FIG. 1 shows a trailer T that includes a first reciprocating slat conveyor 10 and a dock D that includes a second reciprocating slat conveyor 12. Although a trailer T is shown, the vehicle may be a truck or some other vehicle having a cargo carrying bed or box. The conveyors 10, 12 are herein sometimes referred to as the vehicle conveyor 10 and the dock conveyor 12. FIG. 1 shows the vehicle conveyor 10 in alignment with the dock conveyor 12. In use, the two conveyors are operated together to either move a load from the trailer conveyor 10 onto the dock conveyor 12 or from the dock conveyor 12 onto the trailer conveyor 10. In this manner, the two conveyors 10, 12 are used together for loading or unloading the trailer T or another vehicle.

The conveyors 10, 12 may be basically like the conveyor disclosed in the aforementioned U.S. application Ser. No. 11/334,978. One difference, however, is that one of the conveyors 10, 12 is a passive conveyor. This means that it does not include its own drive mechanism. The other conveyor of the pair includes a drive mechanism that serves as the drive mechanism for both conveyors 10, 12. In preferred form, the dock conveyor 12 will include a drive mechanism. The vehicle conveyor 10 passive conveyor. It will be without its own drive mechanism. It will be driven by the drive mechanism for dock conveyor 12. A suitable drive system is shown in U.S. application Ser. No. 11/334,978, the contents of which are hereby incorporated herein by the specific reference.

FIGS. 2-7 show a trailer T being aligned with a dock D. They further show a sequence of steps for connecting the trailer slats to the dock slats. The first stage apparatus includes a pair of beams 14, 16, one on each side of the dock D. These beams 14, 16 include rearwardly projecting end portions 18, 20 having cam surfaces 22, 26 that converge from their outer ends to their inner ends. A second pair of beams 26, 28 are positioned below the dock conveyor 12 and the truck conveyor 10. These beams 26, 28 are extendable from the dock D to positions below the trailer T, and are retractable back towards the dock D. They have hooks at their outer ends that hook onto a transverse beam at the rear end of the trailer T. The hooks hold the rear beam 34 on the trailer T against pads 30, 32 on the rear end of the dock D.

Figure 2:
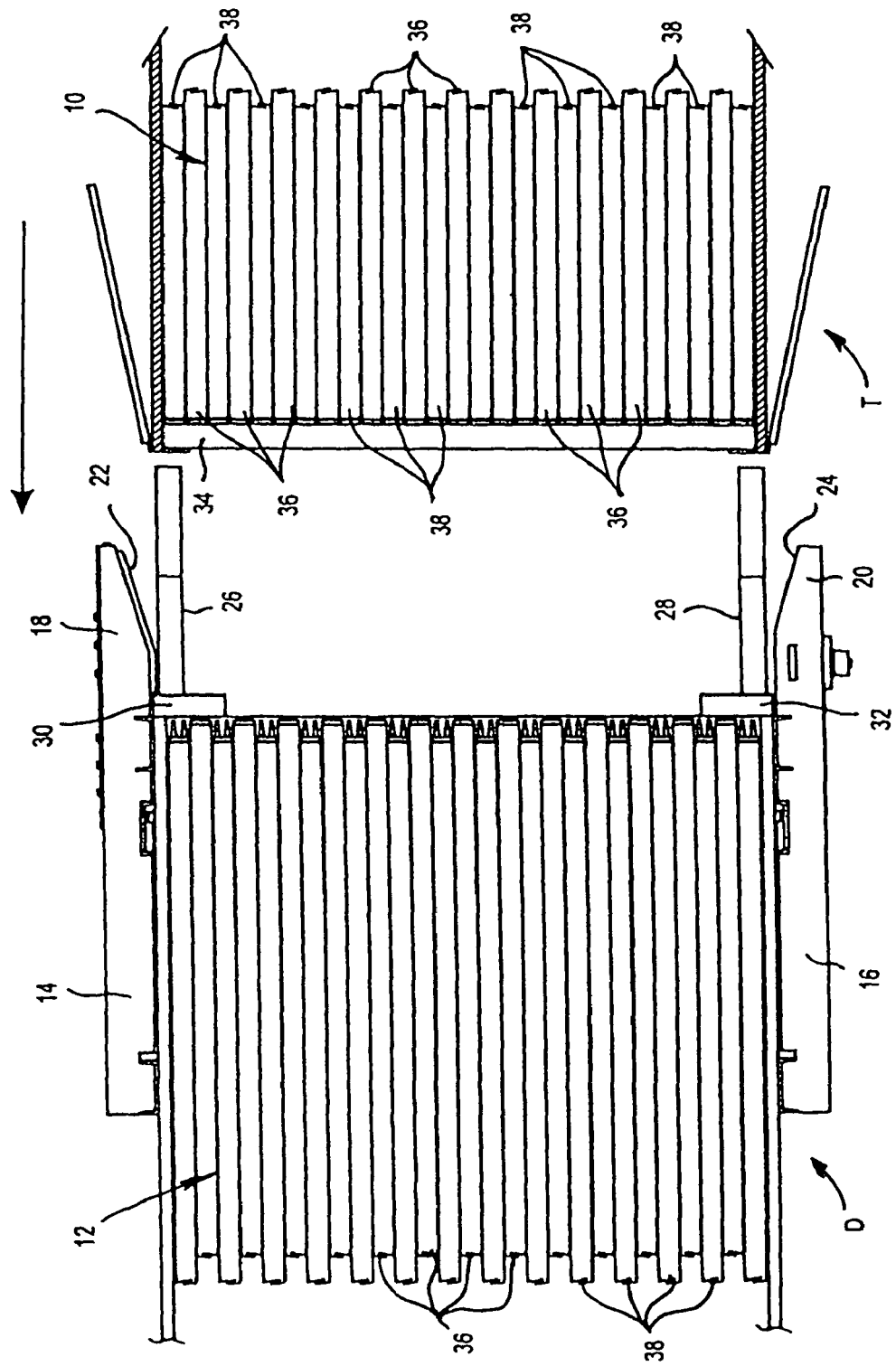
FIG. 2 is a fragmentary plan view of confronting rear end portions of a dock and a trailer, showing the trailer in the process of being backed towards the dock.
Figure 3:
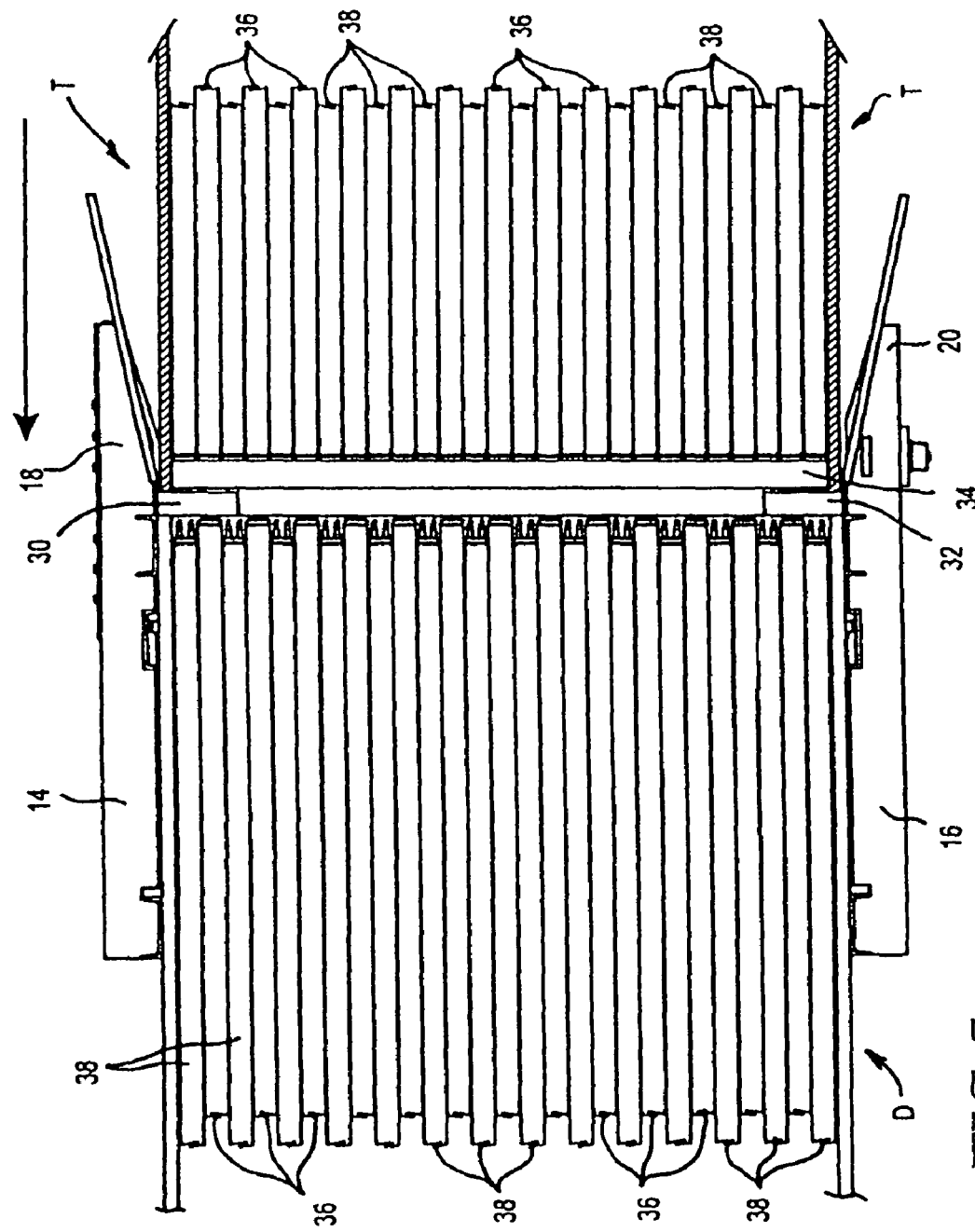
FIG. 3 is a view like FIG. 2, showing the vehicle backed up into contact with bumpers on the dock, and showing the confronting ends of the conveyor on the dock and in the vehicle spaced apart.
Figure 4:
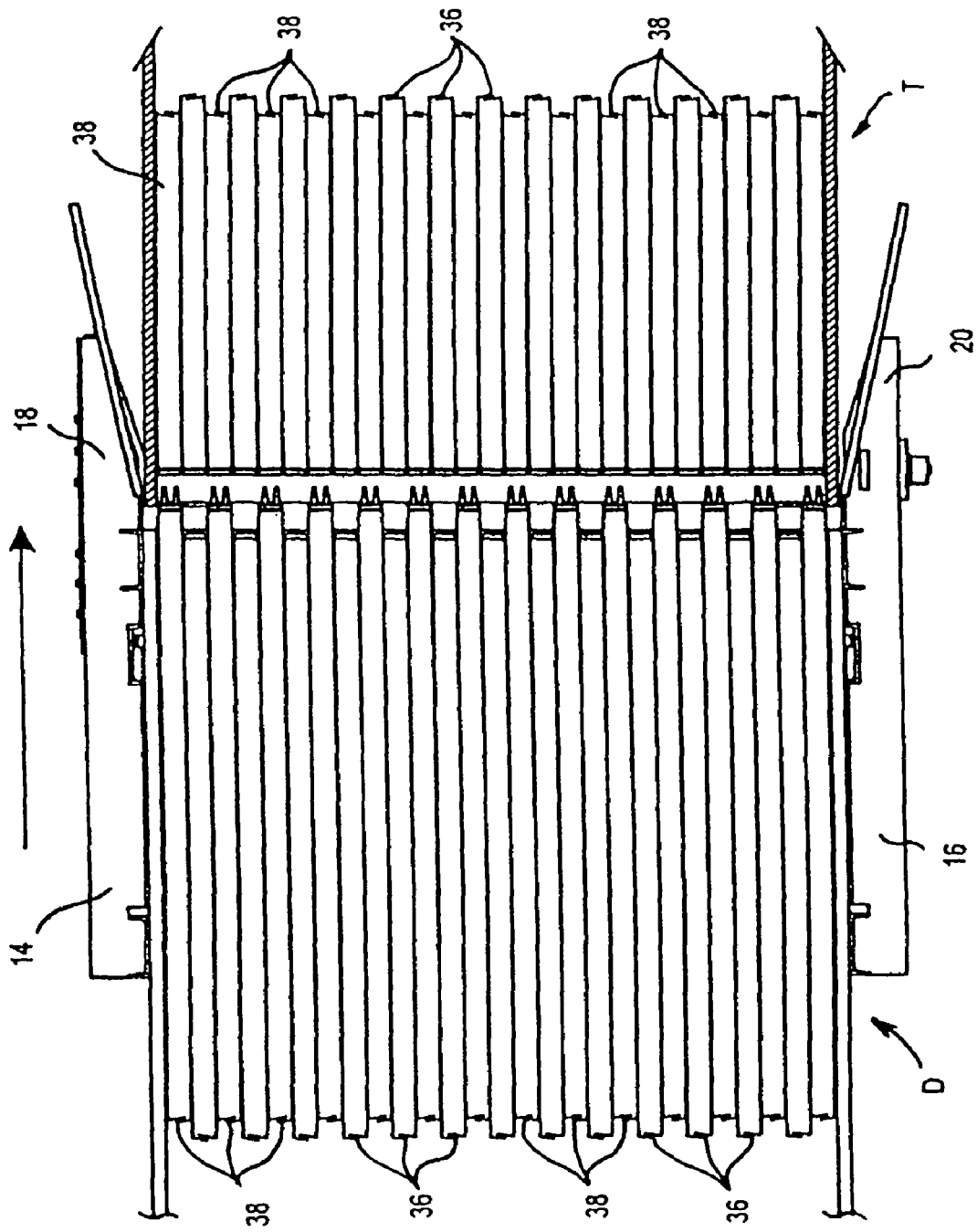
FIG. 4 is a view like FIG. 3, showing upper portions of lifting/holding slats being extended towards complementary end portions of like members in the trailer.
Figure 5:
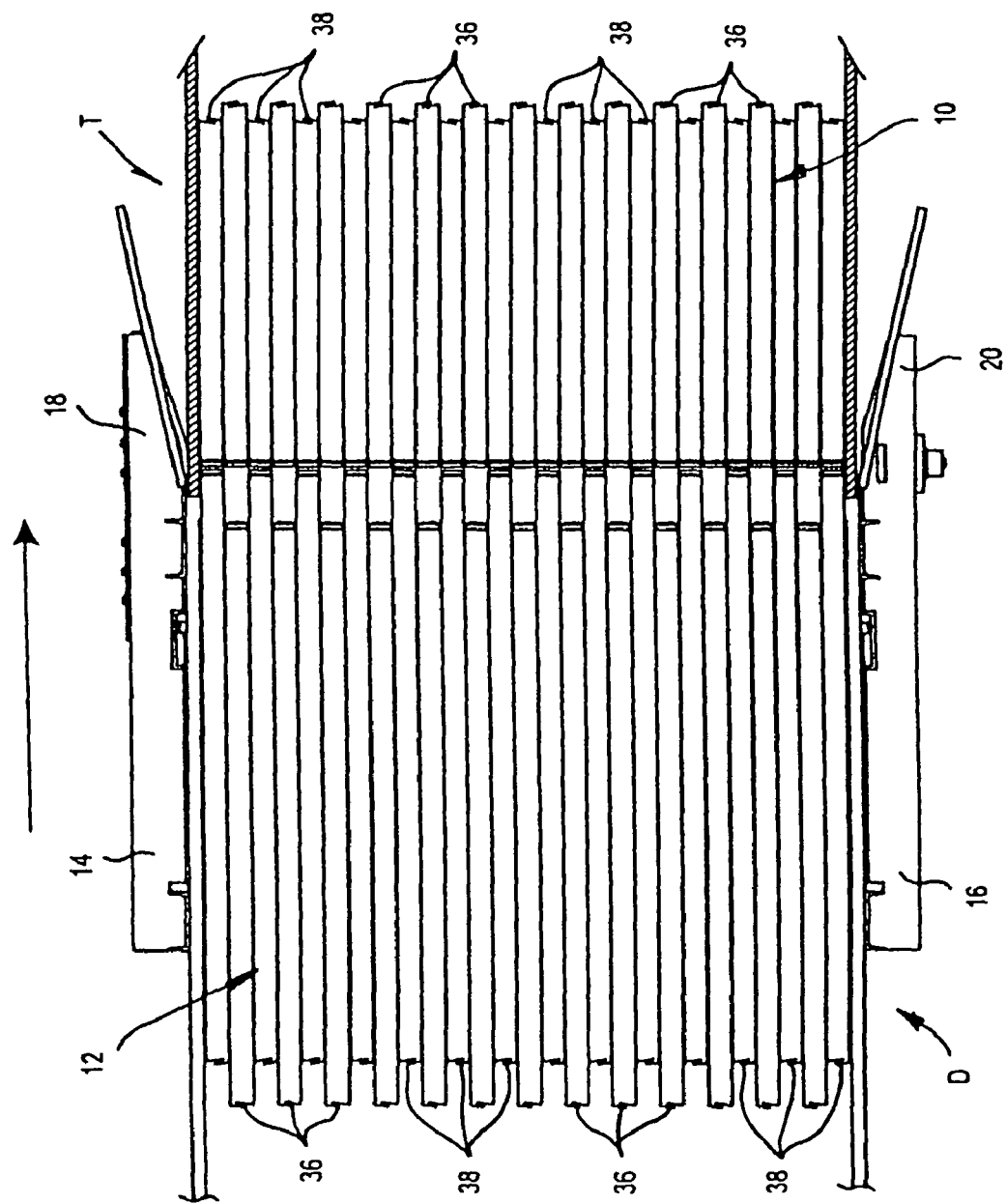
FIG. 5 is a view like FIG. 4 showing the ends of the upper portions of the lifting/holding slats on the dock moved into engagement with the ends of the upper portions of the lifting/holding slats in the vehicle.
Figure 6:
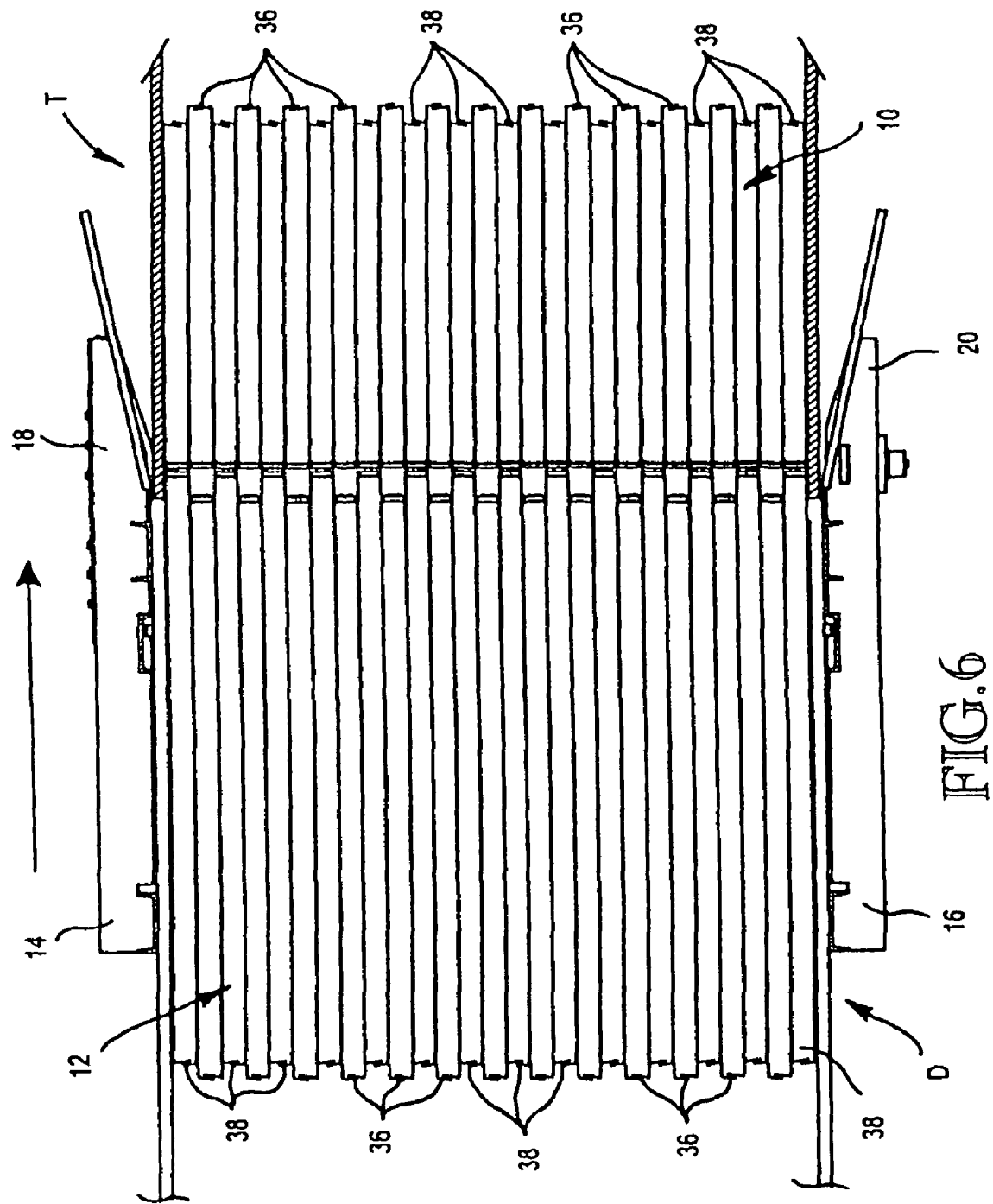
FIG. 6 is a view like FIG. 5, showing the conveying slats on the dock in the process of being moved towards the conveying slats in the vehicle.

FIG. 2 shows the trailer T in the process of being backed up towards the dock D. FIG. 3 shows the trailer T with its rear beam 34 contacting the pads 30, 32. In FIG. 3, the conveying slats on the dock D, some of which are designated 36, are shown in a space relationship to the conveying slats 36 in the trailer T. FIG. 3 also shows the rear ends of lifting/holding slats on the dock D, some of which are designated 38, in a spaced relationship from the lifting/holding slats 38' in the trailer T. FIG. 4 shows upper portions of the lifting/holding slats 38 on the dock in the process of being moved towards the confronting ends of the upper portions of the lifting/holding slats 38' in the trailer T. FIG. 5 shows further movement of the upper portions of the lifting/holding slats 38 on the dock D towards the upper portions of the lifting/holding slats 38' in the trailer T. As will hereinafter be described, this movement moves prongs that extend rearwardly from the rear ends of the upper portions of the lifting/holding slats 38 into receiving sockets for them in the rear ends of the upper portions of the lifting/holding slats 38' in the trailer T. FIG. 6 shows the conveying slats 36 on the dock D being moved towards the rear ends of the conveying slats 36' in the trailer T. A hook mechanism carried by the dock slats 36 enter into hook receiving openings in the trailer slats 36'. The hooks are moved into hooking engagement with structure at the rear ends of the trailer slats 36'. Then, the hooks are retracted to cause movement of the trailer slats 36' into tight end-to-end engagement with the dock slats 36. In this manner the hooks hold the two sets of slats 36 together.

The mechanism for coupling the rear end of the trailer T to the rear end of the dock D, including the side beams 14, 16 and the extendable/retractable beams 26, 28, are disclosed in co-pending application Ser. No. 12/004,378, filed Dec. 19, 2007 (now published US 2008-0175697 A1), and entitled Vehicle/Dock Alignment And Coupling System. The mechanism for coupling the rear ends of the dock slats 36 to the rear ends of the trailer slats 38, and connect the rear ends of the dock slats 38 with the rear ends of the trailer slats 38, will hereinafter be described. Firstly, however, the conveying slats 36, 36' and the lifting/holding slats 38, 38' will be described with reference to FIGS. 8-12. A more comprehensive disclosure of a conveyor composed of the slats 36, 38, including the mechanism for reciprocating the conveying slats 38 and the mechanism for raising and lowering the upper portions of the lifting/holding slats 38 are disclosed in co-pending application Ser. No. 11/334,978, the contents of which are hereby incorporated herein by this specific reference.

The conveying slats 36, 36' are constructed in the manner disclosed in the aforementioned U.S. Pat. Nos. 5,588,522; 4,896,761 and 4,679,686. U.S. Pat. Nos. 4,896,761 and 4,679,686 disclose in detail the mounting arrangement for slideably securing conveyor slats 36 to a support frame. The support frame includes a guide/support beam 40 for each conveyor slat 36, 36'. A series of bearings 42 snap down onto the beams 40. Seal strips 44 are held in grooves formed in the sidewalls of the conveying slats 36, 36' and extend laterally outwardly to engage side surfaces of the adjacent lifting slats 38, 38'.

FIG. 8 shows the lifting slats 38 for a system that includes fourteen lifting slats 10 and either thirteen or fifteen conveying slats 36, depending on whether the two outside slats are lifting slats 36 or conveying slats 30. The conveying slats 36 are omitted from FIGS. 10 and 12. If they were to be added to FIGS. 10 and 12, they would be positioned between each pair of lifting slats 38 and possibly outside of the two outer most lifting slats 38. The arrangement of the lifting slats 38 to the conveying slats 36 is shown in FIGS. 8 and 9.

As shown in FIGS. 8 and 9, each lifting slat 38 comprises an upper slat (or upper portion) 48 and a lower slat (or lower portion) 50. Preferably, upper slat 48 is an extrusion and lower slat 50 is an extrusion. They may be extruded from an aluminum alloy, or a suitable substitute material, including a plastic resin material. The lower slat 50 has a top 52 and a pair of opposite side portions depending from the top 52. The side portions define a bottom space between them. The bottom slats 50 further include laterally outwardly projecting first flanges 54, 56. The vertically movable upper slat 48 includes a top 58 and laterally spaced apart side portions 60, 62 which depend from the top 58. The side portions 60, 62 define a space between them in which the lower slat is situated. The side portions 60 of the upper slat 48 includes inwardly projecting second flanges 64, 66. As a comparison of FIGS. 8 and 9 will show, the upper slat 48 is movable vertically between a lowered position (FIG. 8) in which the second flanges 64, 66 are vertically spaced from the first flanges 54, 56 (FIG. 1) and a raised position in which the second flanges 64, 66 contact the first flanges 54, 56, such contact stopping any further upward movement of the upper slat 48 (FIG. 2).

An inflatable bladder 70 is positioned between the top 52 of the lower slat 50 and the top 58 of the upper slat 48. The bladders 70 extend lengthwise of the slats 48, 50 and are sealed at both of their ends. An air supply/exhaust conduit 72 (FIG. 12) is connected to each bladder 70. A preferred embodiment of the air supply/exhaust conduits 80 is shown in application Ser. No. 11/334,978. Herein, the conduits 80 are shown schematically in FIG. 12.

In the illustrated embodiment, the upper slat 48 includes laterally inwardly projecting third flanges 82, 84 that are situated above both the first flanges 54, 56 and the second flanges 64, 66. When the upper slat 48 is in its lowered position (FIG. 8), the third flanges 82, 84 set down on the first flanges 54, 56 (FIG. 8). The lower slat 52 may include laterally outwardly projecting fourth flanges 86, 88 below the second flanges 64, 66. When the upper slat is in its lowered position the second flanges 64, 66 set down on the fourth flanges 86, 88 (FIG. 8).

Referring to FIG. 10, the upper end of each air supply/exhaust conduit 80 includes a laterally outwardly projecting flange 90 on top of a tubular body 92 having an outside diameter below the flange 90 that fits through an opening formed in a bottom portion of the inflatable bladder 70. The lower portion 94 of the tubular body 92 extends downwardly through an opening in the top 94 of a manifold 96. A tubular spacer 98 has a lower end that sets down on the upper wall 94 of the manifold 96. An O-ring 100 is provided to prevent air leakage out from the manifold 96, between the spacers 98 and the top wall 94 of the manifold 96. The spacer 98 projects upwardly into the inner space 50 in the lower slat 50 at its upper end, the space 98 contacts the top 52 of the slat 50.

The tubular body 98 of the air supply/exhaust conduit 70 extends downwardly through an opening in the top wall 52 of the lower slat 50, then through the center passageway of the tubular space 98, and then through an opening in the top wall 94 of the manifold 96. An O-ring 102 is positioned between the upper end of spacer 98 and the bottom surface of top wall 52. This O-ring 102 seals against the escape of air from the manifold 96, through the opening 104, through the center of the space 98 and between the upper end of the spacer 98 and the top wall 52. An opening the lower end portion of the conduit 80 is internally threaded. An opening 108 is provided in the lower wall 106 of the manifold 96. The threaded shank portion of a bolt 110 is inserted upwardly through the opening 112 and is screwed into the threaded opening 114. The lower end of the bolt 110 includes an annular groove in which an O-ring seal is received (not shown). When the bolt 110 is tightened, the seal bears against the lower wall 106 of the manifold 96 and seals against air leakage from the manifold 96 through the opening 112 and between the bolt head and the manifold wall 106. When the bolt 110 is tightened, the flange 90 is drawn down into tight engagement with the lower wall of the bladder 70 where it immediately surrounds the opening through which the tubular body 98 is inserted. A flat is formed on one side of the tubular body 98. A transverse lock pin is inserted through an opening formed in the spacer 98. Its inner portion contacts the flat and prevents spacer 98 from rotating relative to the tubular body 80 and vice versa.

Radial openings 118 extend through the lower portion of the supply/exhaust conduit 80 and communicate the inside of the manifold 96 with the inside of the conduit 80 and the inside of the inflatable bladder 70.

Figure 12:
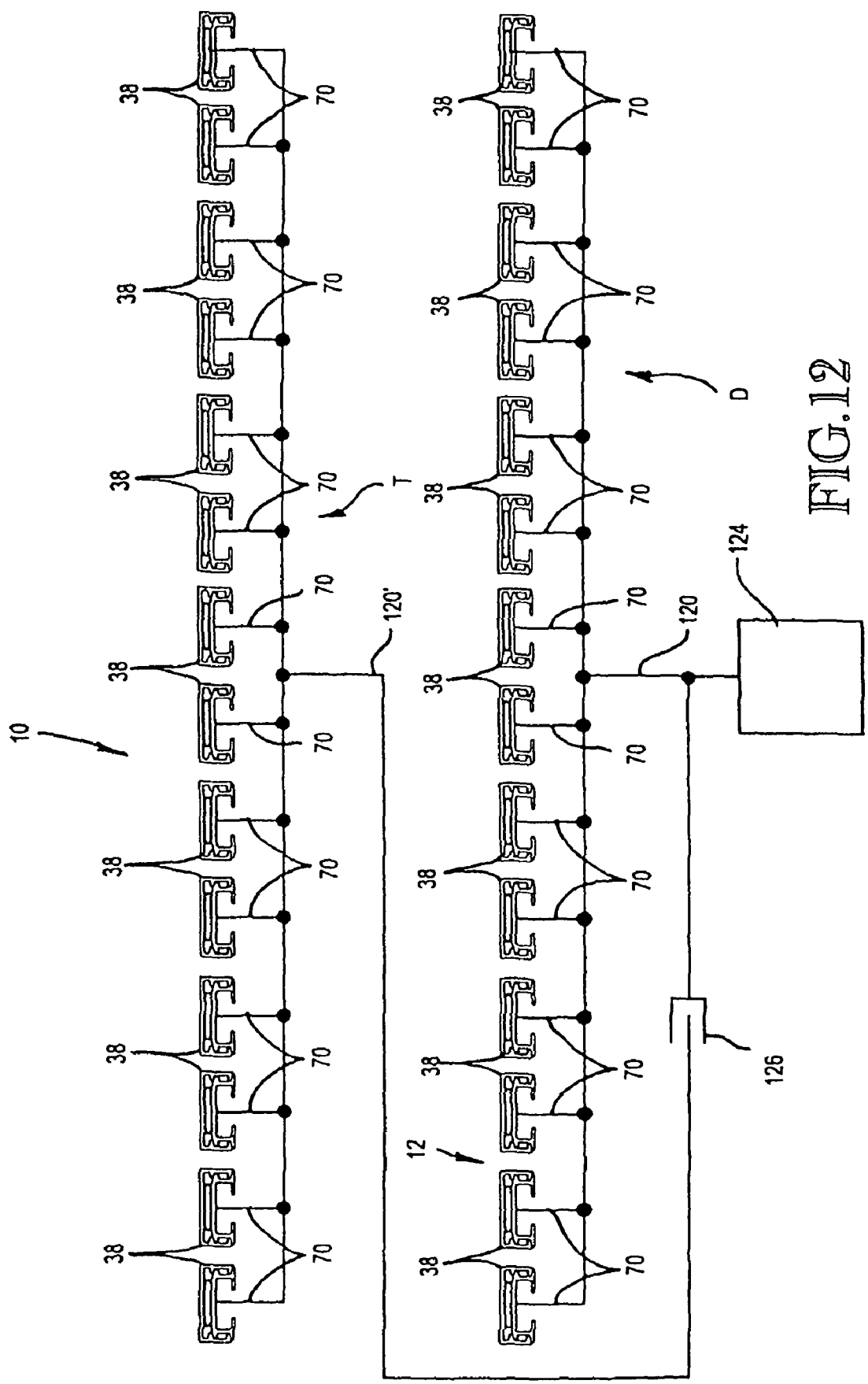
FIG. 12 is a circuit view showing lifting bladders for a set of lifting/holding slats on a dock and for a like number of lifting/holding slats in a trailer.

FIG. 12 shows a schematic diagram of the air system for inflating the bladders 70. The upper portion of FIG. 12 represents the lifting/holding slats 38 in the trailer T. The lower portion of FIG. 12 represents the lifting/holding slats on the dock D. An air supply system is represented by block 124. A schematic diagram of the system 124 is disclosed in application Ser. No. 11/384,978. The particular details of the system are not a part of the invention and so the system will not be described in any detail. A coupling 126 is provided at a suitable location between conduit 120 for the dock conveyor 12 and conduit 120' for the trailer conveyor 10. When the trailer T is backed up to the dock D and the conveying slats 36 in the trailer T are coupled to the conveying slats 36 on the dock D, and the upper portions of the lifting/holding slats 38 in the trailer T are coupled to the upper portions of the lifting/holding slats 38 on the dock D, the coupling 126 is operated to interconnect the lines 120, 120' so that operation of the system 124 will deliver compressed air to and from the bladders 70 in both conveyors 10, 12.

Figure 13:
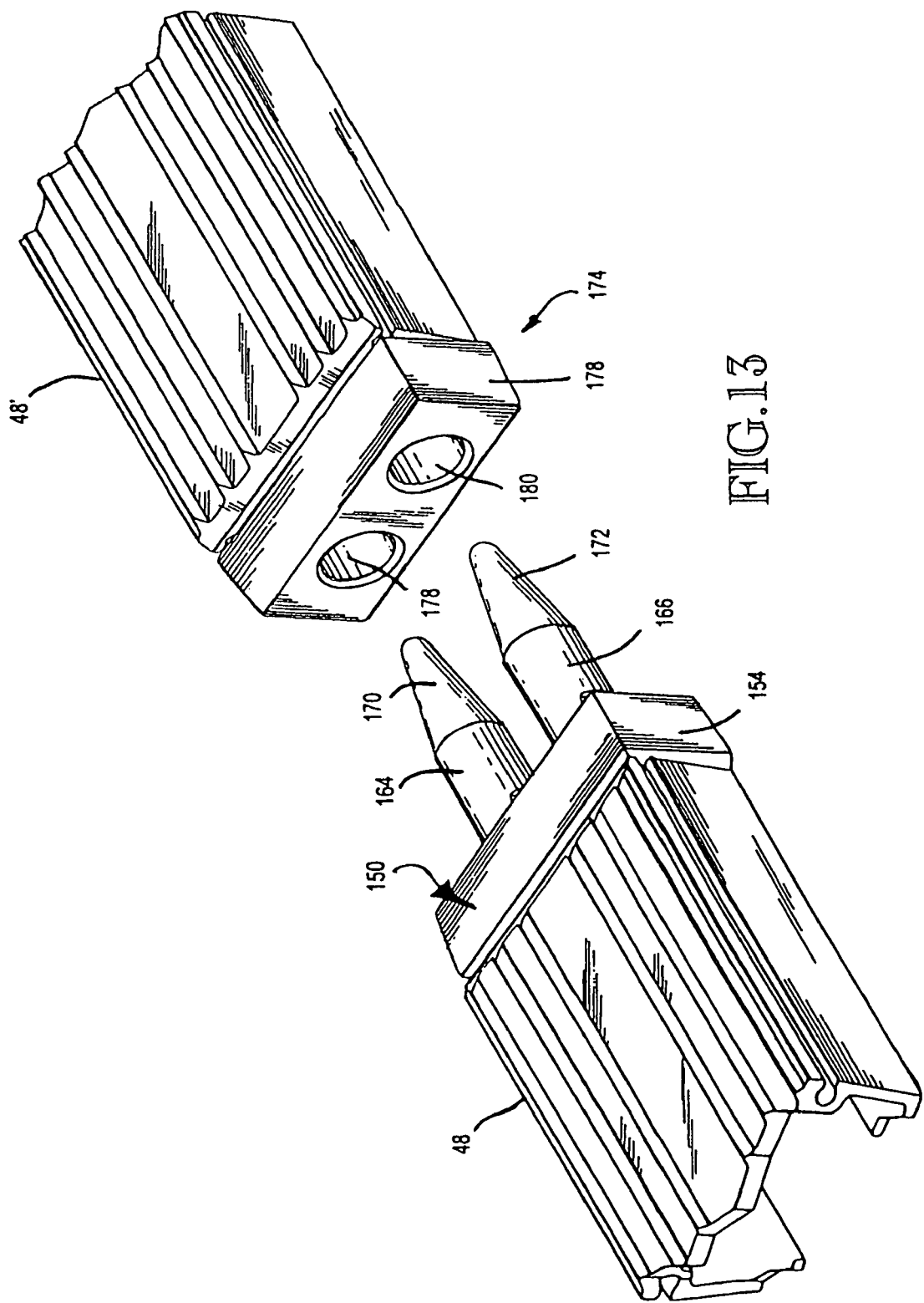
FIG. 13 is a fragmentary pictorial view of confronting end portions of a lifting/holding slat on a dock and a complementary lifting/holding slat in a trailer, such view being taken from above and looking towards the top and a common side of the slats, and showing a pair of prongs at the rear end of the lifting/holding slat that is on the dock.
Figure 14:
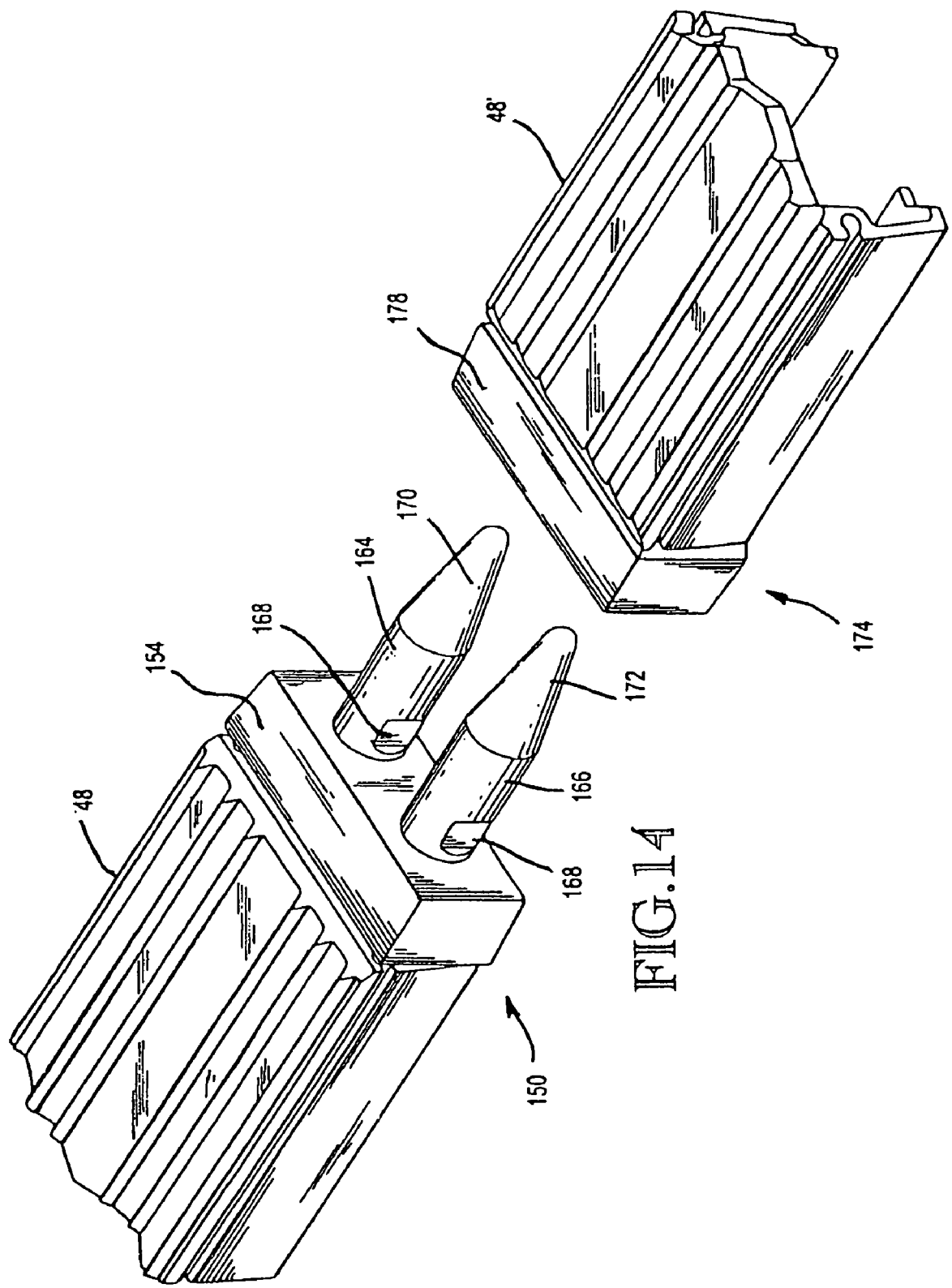
FIG. 14 is a view similar to FIG. 13, but looking towards the socket at the end of the lifting/holding slat in the trailer that receives the prongs.
Figure 15:
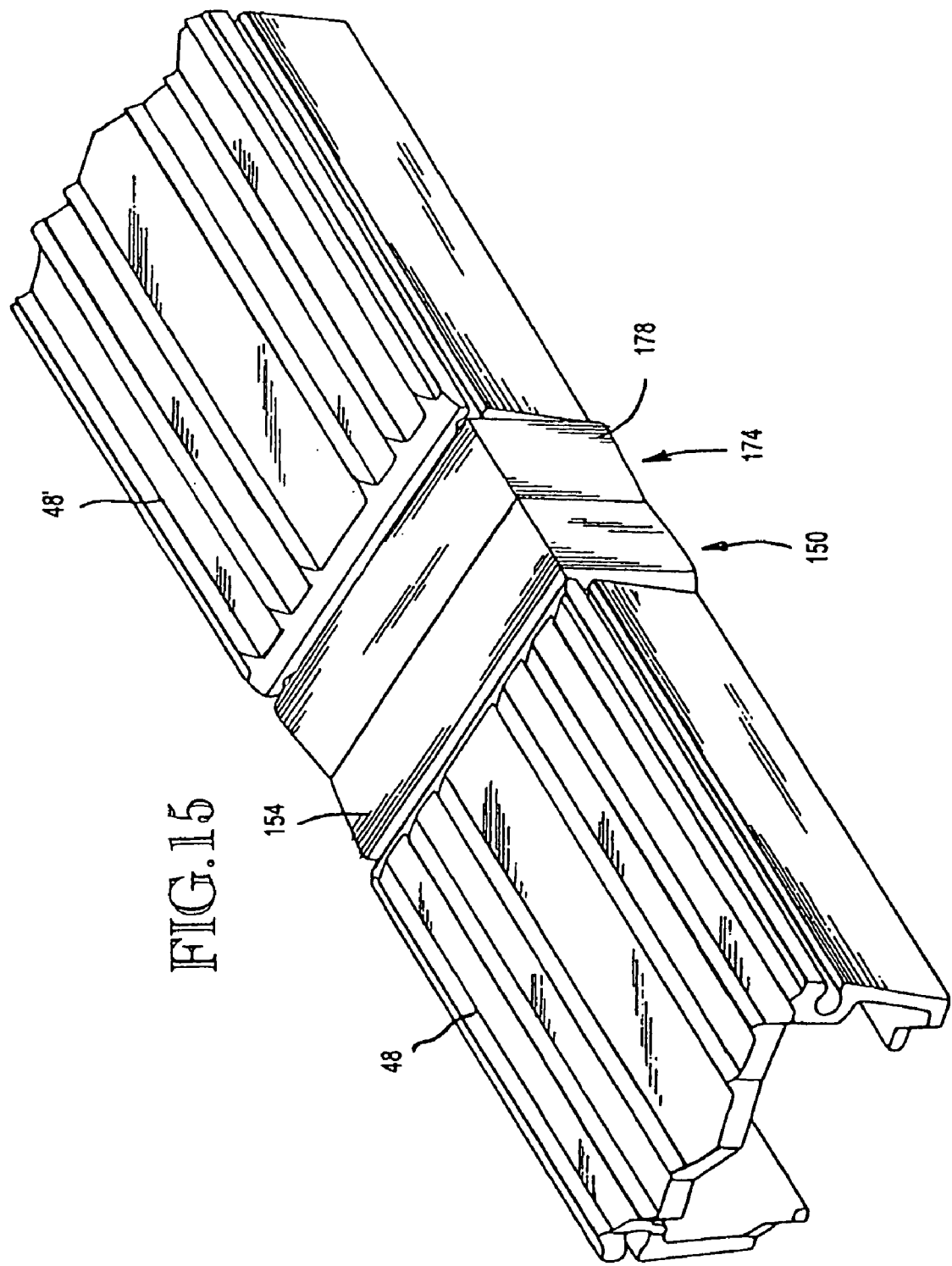
FIG. 15 is a view like FIG. 14, but showing the end portions of the two lifting/holding slats moved together so as to place the prongs in the sockets and lock the two slats together for mutual up and down movement.
Figure 16:
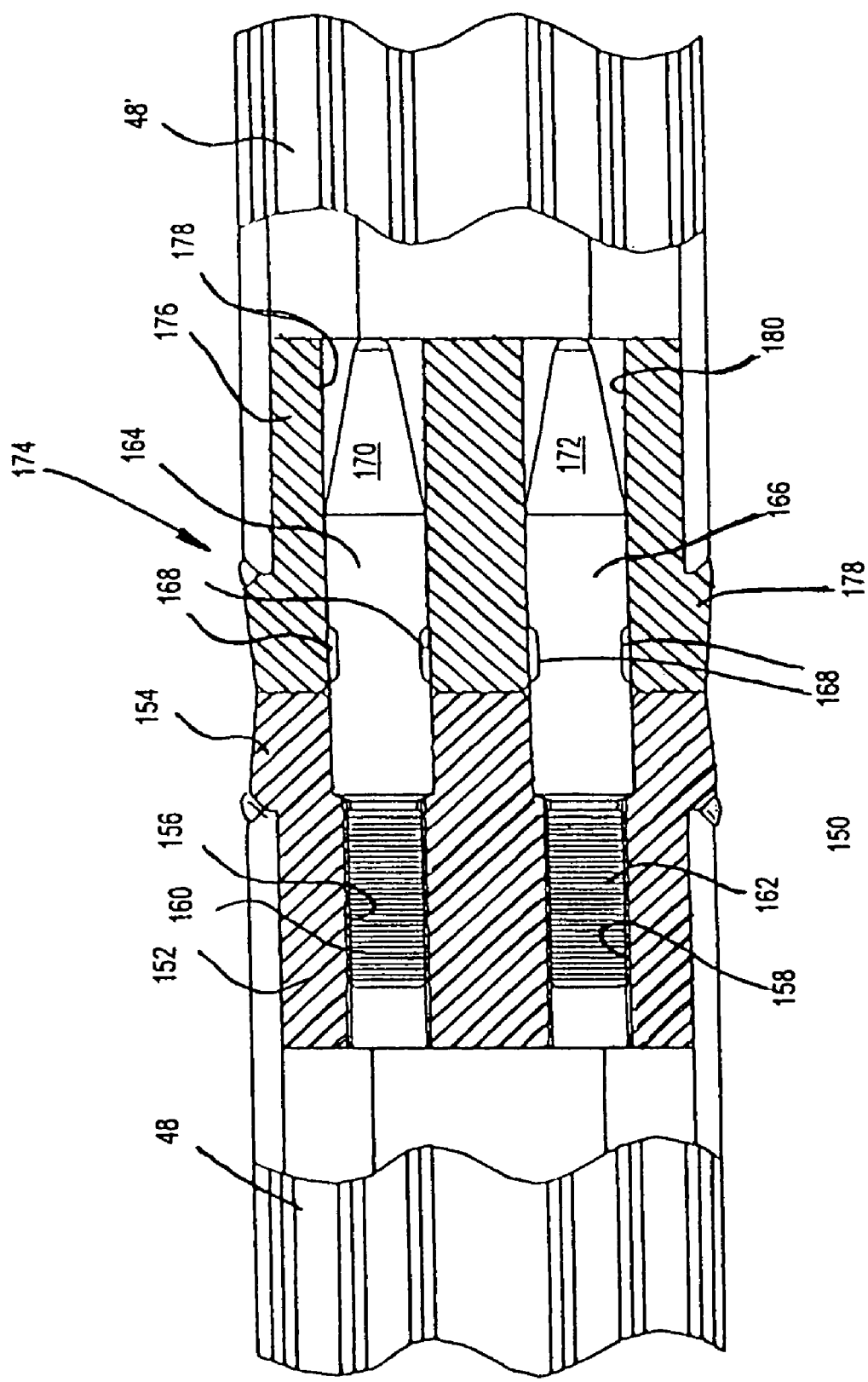
FIG. 16 is a plan view of the connection shown by FIG. 15, with the rear ends of the slats and the connector elements at the rear ends of the slats shown in section.
Figure 25:
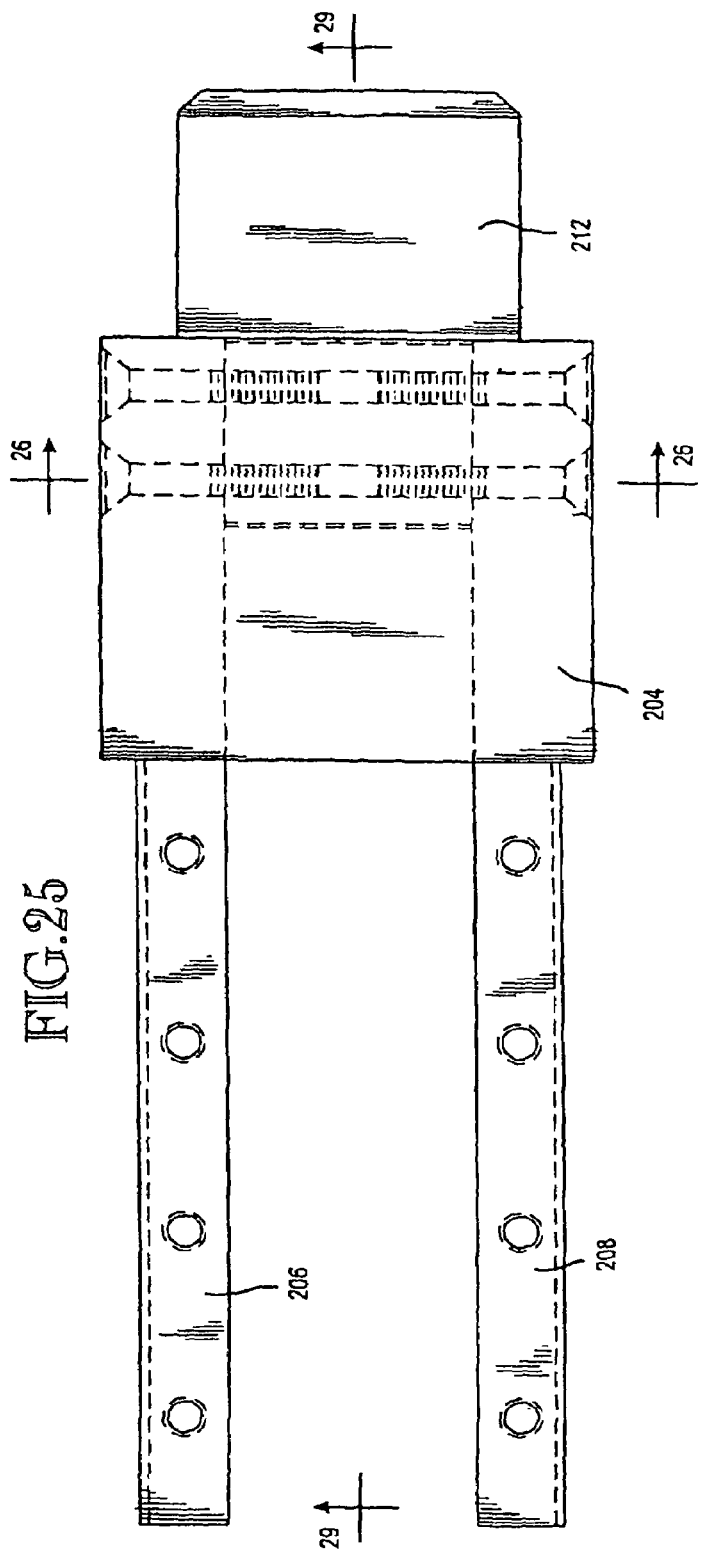
FIG. 25 is a top plan view of a fitting at the rear end of a conveying slat on the dock.

FIGS. 13-16 show an example apparatus for connecting together the lifting/holding slats 48 on the dock D and the lifting/holding slats 48' in the trailer T. In the description of these figures, numeral "48" will be used to designate the lifting/holding slats on the dock D and numeral "48" will be used to designate the lifting/holding slats that are in the trailer T. As best shown by FIGS. 13, 14 and 16, slats 48 are provided with fittings 150 having an inner end portion 152 that extends into the rear end portion of the dock slat 48 and an enlarged rear end portion 156 that extends endwise of the slat 48. Inner portion 152 of member 150 includes a pair of parallel, threaded openings 156, 158 in which threaded shank portions 160, 162 of a pair of prongs 164, 166 are received. Prongs 164, 166 may be formed to include wrench flats 168. The prongs 164, 166 are initially screwed by hand into the threaded openings 156, 158. When it becomes difficult to turn them any further by hand, wrench jaws are positioned to grip the wrench flats 168 and the wrench is used for finishing the connection of the prongs 164, 166 to the end member 150. Preferably, the prongs 164, 166 have rounded or tapered rear end portions 170, 172.

An end fitting 174 is connected to the rear ends of each slat 48' in the trailer T. Each member 174 includes an inner end portion 176 that is snuggly received in the rear end portion of the slat 48'. It also includes an enlarged outer end portion 178 that extends endwise from the slat 48'. Member 174 includes a pair of parallel longitudinal sockets 178, 180 sized and shaped to receive the projecting end portions of the prongs 164, 168. The rounded or tapered end portions 170, 172 of the prongs 164, 166 can be easily inserted into the openings 178, 180, by an endwise movement of dock slats 38 towards trailer slats 48'. This is the maneuver shown by FIGS. 4 and 5.

Members 150, 172 are preferably welded to the slats 48, 48' where the ends of the slats meet the enlarged portions 154, 178. As will hereinafter be described in greater detail, the connected portions of the lifting/holding slats 48, 48' only move up and down in so the insertion of prongs 164, 166 into sockets 178, 180 provides sufficient coupling of the two slats 48, 48' to cause the slats 48, 48' to move together in the vertical direction.

FIG. 17-38 relate to a preferred embodiment of the apparatus that is provided for detachably connecting the confronting ends of the conveying slats 36, 36' on the dock D and in the trailer T. In these figures, the conveying slats on the dock D are designated "36." The conveying slats in the trailer T are designated "36'".

Figure 27:
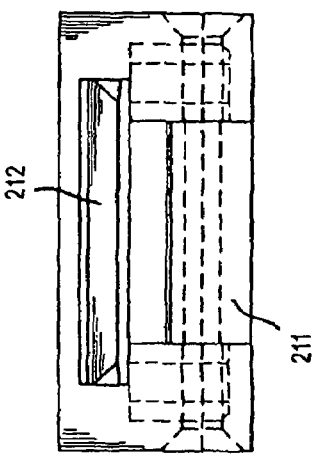
FIG. 27 is an end view of the fitting shown by FIG. 25, looking towards the outer end of the fitting.
Figure 26:
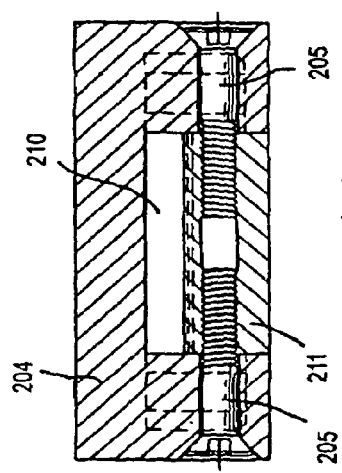
FIG. 26 is a sectional view taken substantially along line 26-26 of FIG. 25.
Figure 30:
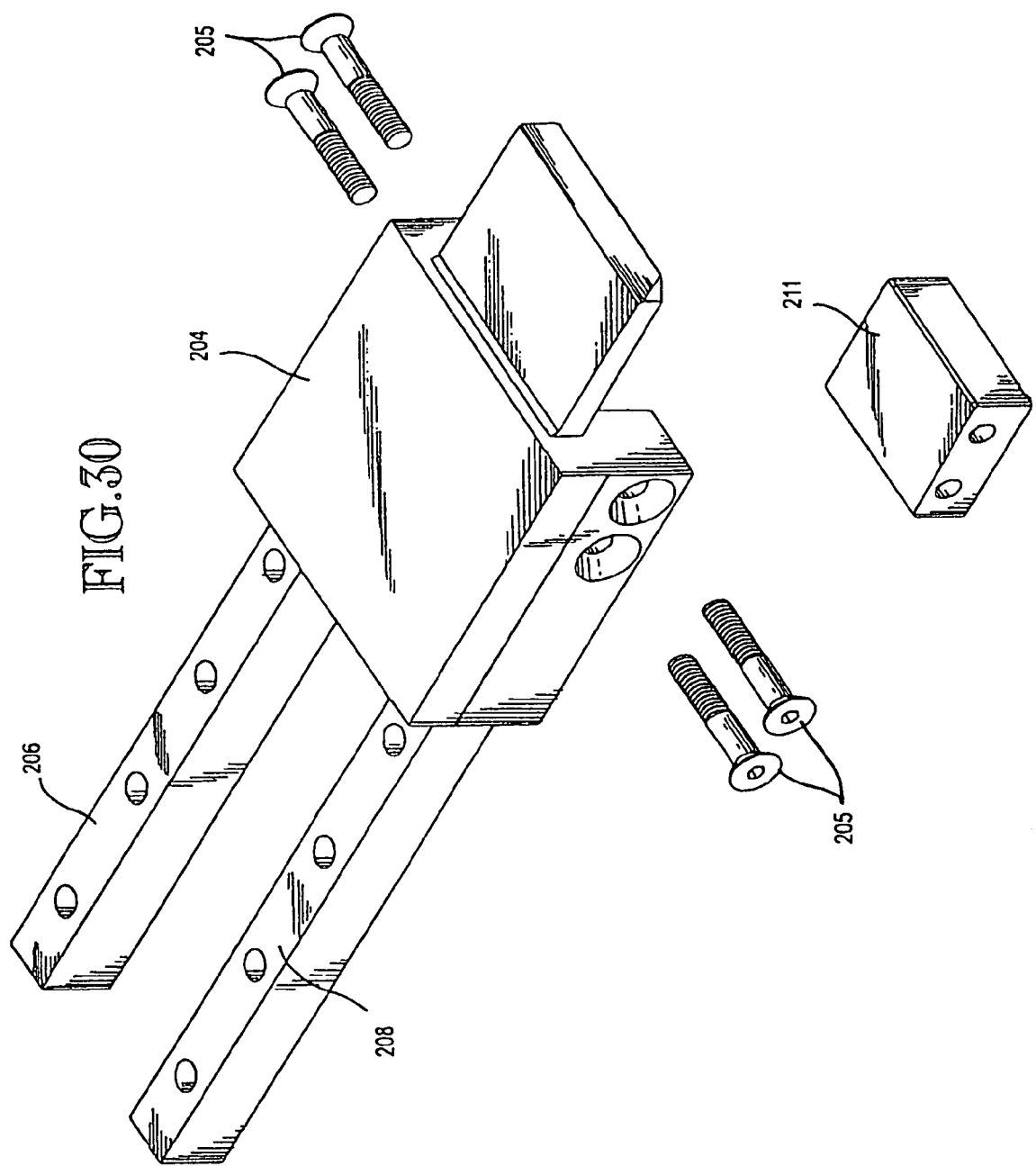
FIG. 30 is a exploded pictorial view of the assembly shown by FIGS. 28 and 29.

FIG. 17 shows a connector component 200 that is connected to the dock slats 36 and a connector component 202 that is connected to the trailer slats 36'. FIG. 18 shows the apparatus 200 connected to the rear end portion of a dock slat 36 and also shows apparatus 202 connected to the rear end portion of the trailer slat 36'. Apparatus 200 includes an end block 204 that is connected to the end portion of the dock conveyor slat 36. FIG. 17 shows connector bars 206, 208 having rear end portions that are welded to the block 204. The connector bars 206, 208 extend axially inwardly within the interior of the slat 36. See FIGS. 18-22. As shown by FIGS. 26 and 27, block 204 includes a tunnel opening 210 closed at its bottom by a block 211 that is connected to block 204 by bolts 205. The outer end of the member 204 includes an elongated, somewhat flat shim 212 that projects endwise rearwardly from the rear end of member 204. Shim member 212 has a lower surface 214 that is a coplanar extension the top surface of 216 in tunnel opening 210.

Member 202 includes a rear end portion 218 that is welded at its inner end 220 to a connector plate 222 (FIG. 17). Connector plate 222 is bolted to the lower flanges of the trailer slat 36'. The connector member 222 is moved endwise into the conveyor slat 36' until its inner end contacts the outer or rearward end of the conveyor slat 36'.

An extendable/retractable hook member 223 has a rear end connector portion 226 used for connecting it to the conveyor slat 36'. It also has an elongated bar portion 224 that extends from the connector portion 226 to a hook portion 228. Member 224 is sized to fit within the tunnel opening 210. Preferably, the end portion 226 of member 224 is adapted to fit inside of the dock conveying slat 36 (FIG. 33).

One embodiment of member 202 is shown by FIGS. 34-37. It comprises an axial opening having an entry portion 232 that is formed between an upper inside surface 234 and a top surface 236 on a lug 238 that confronts surface 232. The entry 232 is defined vertically between surfaces 234 and 236 and horizontally between surfaces 240, 242. This entry 232 is sized to receive and pass the end portion of the connector member that includes bar 224 and hook 228.

Figure 37:
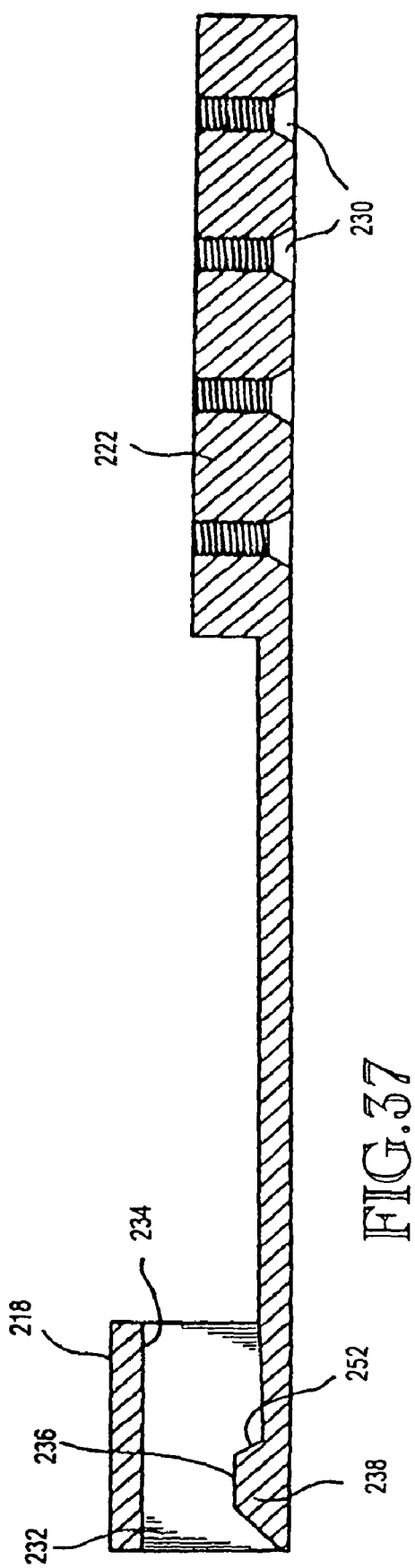
FIG. 37 is a longitudinal sectional view taken substantially along line 37-37 of FIG. 34.
Figure 36:
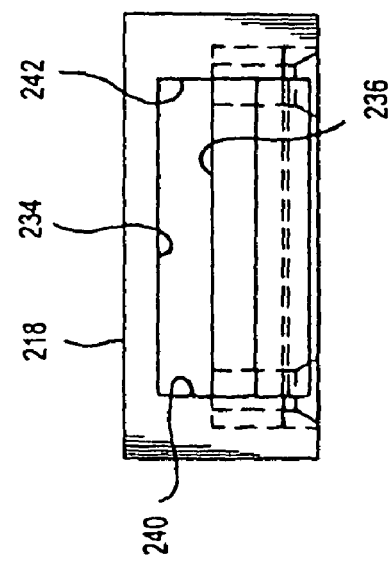
FIG. 36 is an end view of the rear end fitting for a conveying slat in the trailer, looking towards the outer end of the fitting.
Figures 38, 39, 40:
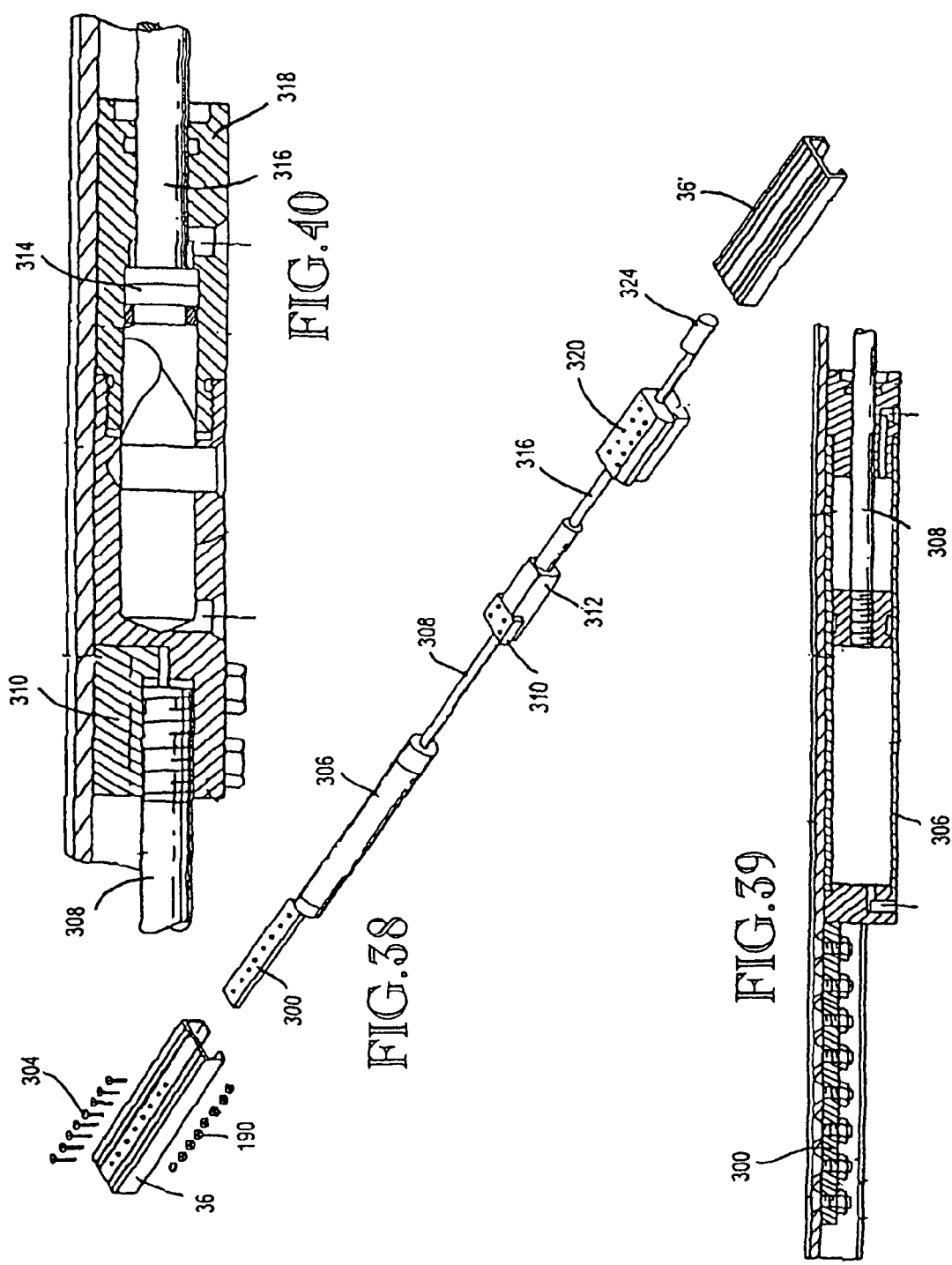
FIG. 38 is an exploded pictorial view of a second embodiment of a mechanism for coupling together the confronting ends of the conveyor slats within the trailer and on the dock, such view showing end portions of two conveyor slats that are to be connected and further showing most of the mechanism that does the connecting.
FIG. 39 is an enlarged scale, fragmentary, longitudinal sectional view of a linear hydraulic motor that is carried by at least one conveyor slat from each slat set in the dock conveyor.
FIG. 40 is an enlarged scale, fragmentary, longitudinal sectional view where the rod end of the linear hydraulic motor shown by FIG. 40 joins the cylinder end of a rotary linear hydraulic drive unit that functions to rotate a piston rod that has a hook at its outer end.

As will hereinafter be described, in some detail, the bar 224 and hook 228 are extendable and retractable relative to their conveying slat 36. When the members 224, 228 are extended away from member 204, the hook 228 is inserted into and through the entry 232. When the hook is inside the member 202, the bar 224 will drop down onto the surface 236 of a lug 238. Thereafter, the dock slat 36 is extended towards the trailer slat 36'. This moves the shim 212 into the member 202, into a position snuggly between interior surface 234 of member 202 and the top of the member 224 where it extends over the hook 228. Once the shim 212 is in place within the member 202, the connector member 224 is retracted so as to move hook surface 250 (FIG. 31) back against surface 252 on lug 238 (FIG. 37). Herein, surface 252 is referred to as the first lock surface 252 and surface 250 on the hook 228 is referred to as the second lock surface 250. The hook 228 is retracted so that it contacts the lug 238 and pulls the end portion of the trailer conveying slat 36' tight against the end portion of the dock conveying slat 36 (FIGS. 23 and 24). This pull on the hook 228 is maintained for the purpose of holding lock surface 250 tight against lock surface 252. This firmly connects the two conveying slats 36, 36' together so that a moving force applied to the slats 36 will be transferred to the slats 36' and both sets of slats 36, 36' will move together.

Referring to FIGS. 23 and 24, each conveying slat 36 is provided with a linear fluid motor 260 having a cylinder portion 262 and a piston rod portion 264. Inside of the cylinder portion 262, the piston rod portion 264 is connected to a piston head 266. Piston head 266 reciprocates back and forth within the interior 268 of cylinder portion 262. A mounting bracket 270 is connected to the cylinder portion 262 and the inner end 272 of the bar 224 is connected to the bracket 270 by bolts 272. The outer end of piston rod 264 is connected to a second bracket 274 that is also connected to the lower flanges of the conveying slat 36, such as by bolts 276. Accordingly, the piston rod 264 is connected to the slats 36 and moves with them. The cylinder portion 262 is movable relative to both the piston 262 and the slat 36. Because end portion 226 of bar 224 is connected to the cylinder body 262, the bar 224 and the hook 226 move with the cylinder body 262.

FIGS. 23 and 24 show the piston head 266 positioned adjacent the open end of the cylinder portion 262. When in this position, the two lock surfaces 250, 252 are together and the two slats 36, 36' are connected together. When a motive fluid is introduced between piston head 266 and the end member 280 while motive fluid is removed from chamber 268, the cylinder portion 262 and the bar 224 and hook 228 will move to the right, as illustrated in FIG. 23. When the hook 228 is sufficiently inside of the conveying slat 36', the slat 36 can be retracted away from slat 36'. The slat 36, the end fitting 204 will move along the bar 224 as they retract. After the shim 226 has been retracted out from the entry portion 232 of fitting 202 and moved a sufficient distance away from the fitting 204, the linear fluid motor 260 can be operated for retracting the bar 224 into conveying slat 36, moving with it the hook 228 through the entry 232. This disconnects the trailer conveying slat 36' from the dock conveying slat 36, allowing movement of the trailer T away from the dock D.

FIGS. 38-43 show a modified construction of the hook mechanism for releasably coupling the two slats 36, 36' together. This mechanism is disclosed in substantial detail in U.S. Pat. No. 5,911,555, which is incorporated herein by this specific reference. In this embodiment, a mounting bracket 300 at one end of a linear fluid motor 302 is connected to conveying slat 36, such as by bolts 304. In the illustrated embodiment, the mounting bracket 300 is connected to the cylinder component 306. The piston component includes a piston rod 308 that extends outwardly from the cylinder component 306 and connects to a mounting member 310 that is at the closed end of a second fluid motor 312 that includes a piston 314 that both rotates and reciprocates in a fluid chamber. A piston rod 316 projects from the piston 314 through a passageway in an end member 318 and then through guide blocks 320, 322 to a hook 24 at its outer end. As shown by FIGS. 41-43, the trailer conveying slats 36' include blocks 326 that include longitudinal openings 328 that are sized and shaped to allow passage of the hook 324 through them when the hook 324 is properly aligned with the opening 328. FIG. 42 shows the alignment of the hook 324 with the opening 328 that allows linear movement of the hook 324 through the opening 328. FIG. 41 shows a rod and hook 316, 324 positioned for passage through the opening 328. The hook 324 is spaced inwardly of the slat 36 from the block 328. In the next view in FIG. 41, the rod 316 and hook 324 have been extended into and through the opening 328. The third view shows the rod 316 and the hook 324 rotated towards a lock position. The fourth view in FIG. 41 shows the rod 316 and the hook 324 retracted back towards the block 326. FIG. 41 shows the hook 324 rotated into a position in which it will contact an end portion 326' of the block 326 in response to a further retraction of the rod 316.

As can be seen from the description presented above, a trailer T or other vehicle equipped with a slat conveyor 10 is backed up to a dock D equipped with a like conveyor 12. As described above, both conveyors comprise conveying slats 36, 36' and lifting/holding slats 38, 38'. The system shown by FIGS. 2-7, forming the invention of co-pending application Ser. No. 12/004,378 (now published US 2008-0175697 A1), first guides the trailer T into a position relative to the dock D that aligns the dock slats 36, 38 with the truck slats 36', 38'. The mechanism then couples the trailer T or other vehicle to the dock D so that both are fixed in position when cargo is either moved from the dock D into the trailer T, or from the trailer T onto the dock D. Next, the lifting/holding slats 38 on the dock D are moved endwise towards the lifting/holding slats 38' in the trailer T. This movement moves the alignment prongs 164, 166 into the sockets 178, 180. Then, the connector members 224, 225, 226, 228 are extended endwise out from the conveying slats 36 on the dock D. This movement moves the hook 228 into and through the entry portion 232 of the passageway in member 202. Once the lock surface 250 on hook 228 is inwardly of the lock surface 252 on lug 238, the dock slat 36 is moved endwise towards the trailer slat 36', so as to move the shim 212 into the upper region of the entry way 232, between surface 234 and member 226. Then, the hook assembly 224, 225, 226, 228 is retracted to bring lock surface 250 against lock surface 252 and pull the confronting ends of the conveying slats 36, 36' in tight contact with each other. The two conveyors 10, 12 are now ready to be operated as one. The drive mechanism for the conveying slats that is carried by the dock D is operated to reciprocate the conveying slats 36, 36' while the lifting/holding slats 38, 38' are in a "down" position. At the end of stroke, air is introduced into the air bladders in the slats 38, 38' and used to raise the upper portions of the slats 38, 38' to place their upper surfaces above the upper surfaces of the conveying slats 36, 36'. This lifts the load up off of the conveying slats 36, 36' so that the conveying slats 36, 36' can be retracted back to a start position. Then, the cycle is repeated over and over until movement of the cargo is completed.

The illustrated embodiments are only examples of the present invention, and, therefore, are non-limitive. It is to be understood that many changes in the particular structure, materials and features of the invention may be made without departing from the spirit and scope of the invention. Therefore, it is my intention that my patent rights not be limited by the particular embodiments that are illustrated and described herein, but rather are to be determined by the following claims, interpreted according to accepted doctrines of patent claim interpretation, including use of the doctrine of equivalents and the reversal of parts.

What is claimed is:

1. A dock/vehicle system comprising:

a loading/unloading dock having a dock end; and a vehicle having a rear end positionable at the dock end;

said dock and said vehicle having complementary conveyors, each said conveyor having a plurality of elongated, laterally spaced apart lifting/holding slats and a plurality of elongated, laterally spaced apart reciprocating conveying slats between the lifting/holding slats;

said conveying slats on the dock having end portions and said conveying slats in the vehicle having complementary end portions that are connectable to the conveying slats on the dock;

said lifting/holding slats each having a lower portion and an upper portion;

said upper portions of the lifting/holding slats on the dock being connectable with the upper portions of the lifting/holding slats in the vehicle;

said dock including means connected to the conveying slats for lengthwise reciprocating, of both the conveying slats on the dock and the conveying slats in the vehicle;

said dock and said vehicle each having means for lifting the upper portions of the lifting/holding slats and moving them together upwardly from the lower portions of the lifting/holding slats on the dock and in the vehicle; and wherein the upper portions of the lifting/holding slats on the dock include rear end portions and dowels extendable rearwardly out from said rear end portions, and the upper portions of the lifting/holding slats in the vehicle have end portions with dowel-receiving openings, whereby the dowels carried by the upper portions of the lifting/holding slats on the dock are extendable into the dowel openings in the upper portions of the lifting/holding slats in the vehicle, said dowels holding the ends of the upper portions of the lifting/holding slats on the dock and in the vehicle together while the lifting/holding slats are moved up and down.

2. The system of claim 1, comprising means incorporated into the dock for actively extending and retracting the conveying slats.

* * * * *